US012580646B2

(12) United States Patent
Wang et al.

(10) Patent No.: US 12,580,646 B2
(45) Date of Patent: Mar. 17, 2026

(54) METHOD AND APPARATUS APPLIED TO PON SYSTEM, SYSTEM, AND STORAGE MEDIUM

(71) Applicant: Huawei Technologies Co., Ltd., Shenzhen (CN)

(72) Inventors: Wei Wang, Dongguan (CN); Feng Xia, Shenzhen (CN); Gang Zheng, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 212 days.

(21) Appl. No.: 18/506,656

(22) Filed: Nov. 10, 2023

(65) Prior Publication Data

US 2024/0080095 A1 Mar. 7, 2024

Related U.S. Application Data

(63) Continuation of application No. PCT/CN2022/079335, filed on Mar. 4, 2022.

(30) Foreign Application Priority Data

May 11, 2021 (CN) .......................... 202110512037.2

(51) Int. Cl.
G02F 1/00 (2006.01)
H04B 10/03 (2013.01)
(52) U.S. Cl.
CPC .................................... H04B 10/03 (2013.01)
(58) Field of Classification Search
CPC ...... H04B 10/27; H04B 10/03; H04B 10/032; H04B 10/272; H04B 10/0795;
(Continued)

(56) References Cited

U.S. PATENT DOCUMENTS 8,538,256 B2 9/2013 Trojer
8,917,990 B2 * 12/2014 Trojer .................. H04B 10/272
398/67

(Continued)

FOREIGN PATENT DOCUMENTS

CN 101547044 A 9/2009
CN 101873166 A 10/2010
CN 111901706 A 11/2020

OTHER PUBLICATIONS

ITU-T G.984.1, Series G: Transmission Systems and Media, Digital Systems and Networks, Digital sections and digital line system— Optical line Optical line, Gigabit-capable passive optical networks (GPON): General characteristics, Mar. 2008, total 43 pages.

(Continued)

*Primary Examiner* — Hanh Phan
(74) *Attorney, Agent, or Firm* — Slater Matsil, LLP

(57) ABSTRACT

In accordance with an embodiment, a method includes determining, by a standby optical line terminal (OLT), that a primary OLT has stopped sending a downlink optical signal over a first management channel; sending, by the standby OLT, a ranging request to a first optical network unit (ONU), over a second management channel, where the first ONU is one of the at least one ONU, and the second management channel is a channel between the standby OLT and the at least one ONU; and obtaining, by the standby OLT, a distance parameter between the first ONU and the standby OLT based on a ranging response received from the first ONU over the second management channel.

21 Claims, 8 Drawing Sheets

(58) Field of Classification Search
CPC .... H04B 10/40; H04B 10/035; H04B 10/038;
H04Q 11/0067; H04Q 11/0066; H04Q
11/0003; H04Q 11/0005; H04J 14/0246;
H04J 14/0282; H04J 14/0245; H04J
14/0247; H04J 14/0278
USPC ...... 398/66, 67, 68, 69, 70, 71, 72, 79, 135,
398/136, 2, 3, 4, 5, 7, 8, 33, 38, 25, 26,
398/27, 45, 48, 49, 82; 370/352, 392,
370/468, 465, 389
See application file for complete search history.

(56) References Cited

U.S. PATENT DOCUMENTS

| | | | | |
|---|---|---|---|---|
| 2008/0131124 A1* | 6/2008 | Nam | ................... | H04B 10/272 |
| | | | | 398/67 |
| 2011/0013903 A1* | 1/2011 | Rafel Porti | ........ | H04Q 11/0067 |
| | | | | 398/1 |
| 2011/0280578 A1* | 11/2011 | Wu | ....................... | H04J 3/0682 |
| | | | | 398/67 |

OTHER PUBLICATIONS

China Telecom Corporation, "Technical Standard, Technical Requirements for EPON Equipment of China Telecom", Q/CT 2360-2011, with English translation, Apr. 2011, total 568 pages.

* cited by examiner

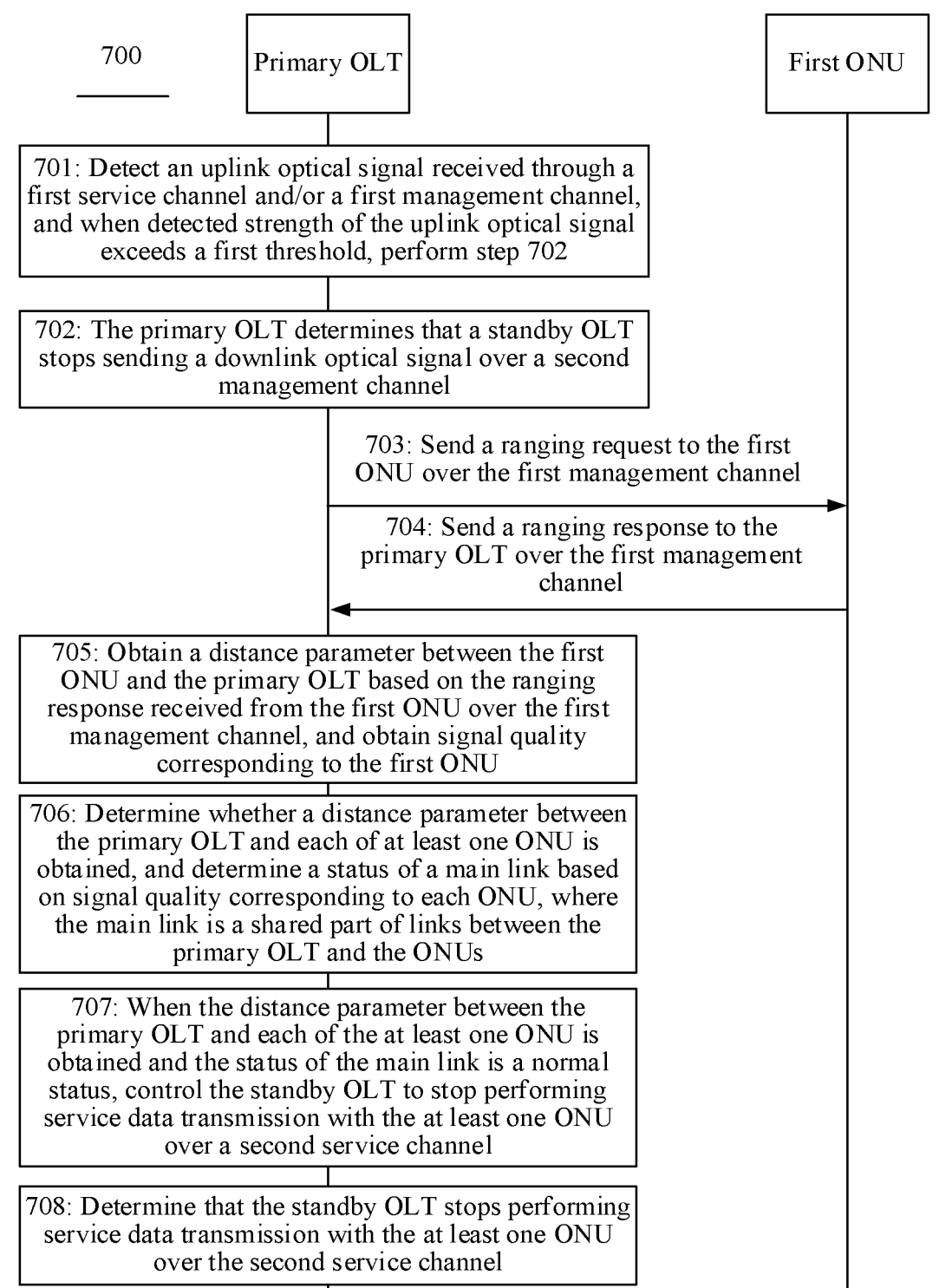

700

| Primary OLT | | First ONU |

701: Detect an uplink optical signal received through a first service channel and/or a first management channel, and when detected strength of the uplink optical signal exceeds a first threshold, perform step 702

702: The primary OLT determines that a standby OLT stops sending a downlink optical signal over a second management channel 703: Send a ranging request to the first ONU over the first management channel 704: Send a ranging response to the primary OLT over the first management channel 705: Obtain a distance parameter between the first ONU and the primary OLT based on the ranging response received from the first ONU over the first management channel, and obtain signal quality corresponding to the first ONU 706: Determine whether a distance parameter between the primary OLT and each of at least one ONU is obtained, and determine a status of a main link based on signal quality corresponding to each ONU, where the main link is a shared part of links between the primary OLT and the ONUs 707: When the distance parameter between the primary OLT and each of the at least one ONU is obtained and the status of the main link is a normal status, control the standby OLT to stop performing service data transmission with the at least one ONU over a second service channel 708: Determine that the standby OLT stops performing service data transmission with the at least one ONU over the second service channel 708: The primary OLT determines that the standby OLT stops performing service data transmission with the at least one ONU over the second service channel

FIG. 7

METHOD AND APPARATUS APPLIED TO PON SYSTEM, SYSTEM, AND STORAGE MEDIUM

CROSS-REFERENCE TO RELATED APPLICATIONS

This application is a continuation of International Application No. PCT/CN2022/079335, filed on Mar. 4, 2022, which claims priority to Chinese Patent Application No. 202110512037.2, filed on May 11, 2021. The disclosures of the aforementioned applications are hereby incorporated by reference in their entireties.

TECHNICAL FIELD

This application relates to the communications field, and in particular, to a method and an apparatus applied to a PON system, a system, and a storage medium.

BACKGROUND

A passive optical network (PON) includes an optical line terminal (OLT), an optical splitter, and a plurality of optical network units (ONUs). The OLT includes a primary port and a standby port. The primary port communicates with the optical splitter through a first main link, the standby port communicates with the optical splitter through a second main link, and the optical splitter further communicates with each ONU.

The OLT uses the primary port to transmit a service to each ONU on a main link. When the main link is faulty, the OLT switches the service to the standby port, measures a distance parameter between the standby port and each ONU, and uses the standby port to transmit the service to each ONU on a standby link based on the measured distance parameter.

In a process of implementing this application, it is found that a current technology has at least the following problems:

After the OLT switches the service to the standby port, it takes a long time to measure a distance between the standby port and each ONU, and then the service can be transmitted based on the measured distance. As a result, service interruption time is excessively long.

SUMMARY

This application provides a method and an apparatus applied to a PON system, a system, and a storage medium, to reduce service interruption duration. The technical solutions are as follows:

According to a first aspect, this application provides a method applied to a PON system, where a first PON system includes a primary optical line terminal OLT, a standby OLT, and at least one optical network unit ONU, the primary OLT performs window open ranging on the at least one ONU over a first management channel, and the primary OLT performs service data transmission with any ONU over a first service channel. The method includes: The standby OLT determines that the primary OLT stops sending a downlink optical signal over the first management channel. The standby OLT sends a ranging request to a first ONU over a second management channel, where the first ONU is one of the at least one ONU, and the second management channel is a channel between the standby OLT and the at least one ONU. The standby OLT obtains a distance parameter between the first ONU and the standby OLT based on a ranging response received from the first ONU over the second management channel.

In a process in which the primary OLT performs service data transmission with each ONU over the first service channel, the standby OLT determines that the primary OLT stops sending a downlink optical signal over the first management channel, and therefore the standby OLT measures a distance parameter between the standby OLT and each ONU over the second management channel. In this way, transmission of the service data between the primary OLT and each ONU is not affected during ranging, and when a service is switched to the standby OLT, the standby OLT directly uses the measured distance parameter between the standby OLT and each ONU to perform service data transmission with each ONU over a second service channel, so that the service can be quickly switched to the standby OLT, to avoid long-time service interruption.

In a possible implementation, the standby OLT receives a ranging notification sent by the primary OLT, where the ranging notification indicates the standby OLT to perform ranging. The standby OLT determines, based on the ranging notification, that the primary OLT stops sending a downlink signal over the first management channel. In this way, the standby OLT may accurately determine, based on the ranging notification, that the primary OLT stops sending a downlink optical signal over the first management channel.

In another possible implementation, the standby OLT receives a ranging notification sent by the primary OLT, where the ranging notification indicates the standby OLT to perform ranging. The standby OLT detects an uplink optical signal received over the second management channel, and when strength of the detected uplink optical signal is lower than a first threshold, determines that the primary OLT stops sending a downlink optical signal over the first management channel. When the ranging notification is received, the strength of the uplink optical signal received over the second management channel is further detected, and based on the strength, it may be more accurately determined that the primary OLT stops sending the downlink optical signal over the first management channel.

In another possible implementation, the primary OLT and the standby OLT are modules in a first OLT device, the primary OLT includes a first port of the first OLT device, the standby OLT includes a second port of the first OLT device, the first management channel and the first service channel are carried on a link between the first port and the at least one ONU, and the second management channel is carried on a link between the second port and the at least one ONU.

In another possible implementation, the standby OLT measures an optical signal corresponding to the ranging response, and determines signal quality corresponding to the first ONU. In this way, signal quality corresponding to each ONU can be measured, so that a status of a main link connected to the standby OLT can be accurately measured based on the signal quality corresponding to each ONU.

In another possible implementation, the signal quality includes received optical power.

In another possible implementation, the standby OLT determines a status of a main link based on signal quality corresponding to each of the at least one ONU, where the main link is a shared part of links between the standby OLT and the ONUs. Because the status of the main link can be determined, when the status is a faulty status, a prompt for repair can be given in time, to ensure that the main link is normal when the service is switched to the standby OLT, and ensure that the service can be successfully switched to the standby OLT.

In another possible implementation, the standby OLT determines that the primary OLT stops performing service data transmission with the at least one ONU over the first service channel. The standby OLT performs service data transmission with the at least one ONU over a second service channel based on a distance parameter between each of the at least one ONU and the standby OLT. Because the distance parameter between each ONU and the standby OLT is already obtained, when the primary OLT stops performing service data transmission with the at least one ONU over the first service channel, the service data can be quickly transmitted to the at least one ONU over the second service channel, to greatly reduce time required for service switching.

In another possible implementation, the standby OLT obtains, based on the distance parameter between each ONU and the standby OLT, configuration information of a sending slot corresponding to each ONU. The standby OLT sends, to each ONU, the configuration information of the sending slot corresponding to the ONU, where the first ONU is configured to send service data in a sending slot corresponding to the first ONU over the second service channel. The standby OLT receives the service data over the second service channel.

In another possible implementation, the standby OLT obtains a compensation delay based on the distance parameter between the standby OLT and the first ONU and a distance parameter between the primary OLT and the first ONU. The standby OLT adjusts, based on the compensation delay, a first receive window to obtain a second receive window, where the first receive window is obtained based on a distance threshold corresponding to the primary OLT, and the distance threshold is greater than or equal to a maximum value of distances between the primary OLT and the ONUs. The standby OLT receives, in the second receive window over the second service channel, the service data sent by each ONU.

In another possible implementation, the standby OLT sends an OLT switching indication to each of the at least one ONU over the second service channel, where the OLT switching indication indicates each ONU to perform service data transmission with the standby OLT over the second service channel.

In another possible implementation, the standby OLT detects an uplink optical signal received over the second service channel. When detecting that strength of the uplink optical signal is lower than the first threshold, the standby OLT determines that the primary OLT stops sending a downlink optical signal over the first service channel. In this way, by detecting the uplink optical signal received over the second service channel, it can be determined in time that the primary OLT stops sending the downlink optical signal over the first service channel, so that the standby OLT switches the service from the primary OLT in time.

In another possible implementation, the distance parameter for communication between the standby OLT and the first ONU includes an equalization delay for communication between the standby OLT and the first ONU. The standby OLT sends the equalization delay to the first ONU.

In another possible implementation, the standby OLT turns on a communication connection between the standby OLT and the first optical distribution network ODN, where a communication connection exists between the primary OLT and the first ODN, and the first ODN communicates with at least one ONU. In this way, one standby OLT can be used as a standby for a plurality of different primary OLTs, to increase networking flexibility.

In another possible implementation, a communication connection exists between the standby OLT and a first interface of an optical line selector, the optical line selector further includes a second interface and at least one third interface, a communication connection exists between the second interface and the first ODN, the at least one third interface is in a one-to-one correspondence with at least one second PON system, for any one of the at least one third interface, a communication connection exists between the third interface and a second ODN included in a second PON system corresponding to the third interface, and the second ODN further communicates with a primary OLT and at least one ONU included in the second PON system. The standby OLT controls the optical line selector to connect the first interface and the second interface. In this way, the primary OLT and the standby OLT form a protection PON system structure by using the optical line selector, to improve networking flexibility.

According to a second aspect, this application provides an apparatus applied to a PON system. The apparatus is configured to perform the method in any one of the first aspect or the possible implementations of the first aspect. Specifically, the apparatus includes units configured to perform the method in any one of the first aspect or the possible implementations of the first aspect.

According to a third aspect, this application provides an apparatus applied to a PON system. The apparatus includes a processor and a memory. The processor and the memory may be connected through an internal connection. The memory is configured to store a program, and the processor is configured to execute the program in the memory, to enable the apparatus to complete the method according to any one of the first aspect or the possible implementations of the first aspect.

According to a fourth aspect, this application provides a computer program product. The computer program product includes a computer program stored in a computer-readable storage medium, and the computer program is loaded by a processor to implement the method in any one of the first aspect or the possible implementations of the first aspect.

According to a fifth aspect, this application provides a computer-readable storage medium, configured to store a computer program, where the computer program is loaded by a processor to perform the method according to any one of the first aspect or the possible implementations of the first aspect.

According to a sixth aspect, this application provides a chip. The chip includes a memory and a processor. The memory is configured to store computer instructions, and the processor is configured to invoke the computer instructions from the memory and run the computer instructions, to perform the method according to any one of the first aspect or the possible implementations of the first aspect.

According to a seventh aspect, this application provides a PON system. The PON system includes a primary optical line terminal OLT, a standby OLT, and at least one optical network unit ONU, the primary OLT performs window open ranging on the at least one ONU over a first management channel, and the primary OLT performs service data transmission with any ONU over a first service channel.

The primary OLT is configured to: when stopping sending a downlink management signal over the first management channel, send a ranging notification to the standby OLT, where the ranging notification indicates the standby OLT to perform ranging. The standby OLT is configured to perform the method in any one of the first aspect or the possible implementations of the first aspect.

In a process in which the primary OLT performs service data transmission with each ONU over the first service channel, when the primary OLT stops sending the downlink optical signal to the standby OLT over the first management channel, the primary OLT sends the ranging notification to the standby OLT, and therefore the standby OLT measures the distance parameter between the standby OLT and each ONU over the second management channel based on the ranging notification. In this way, transmission of the service data between the primary OLT and each ONU is not affected during ranging, and when a service is switched to the standby OLT, the standby OLT directly uses the measured distance parameter between the standby OLT and each ONU to perform service data transmission with each ONU over a second service channel, so that the service can be quickly switched to the standby OLT, to avoid long-time service interruption.

In a possible implementation, the primary OLT is further configured to: when stopping sending the downlink management signal over the first management channel, perform service data transmission with the at least one ONU over the first service channel. In this way, when the standby OLT performs ranging on the ONU, the primary OLT still uses the first service channel to perform service data transmission with at least one ONU, to avoid service interruption.

In a possible implementation, the primary OLT is configured to periodically send the ranging notification to the standby OLT. Because a distance of an ONU may change, when the ranging notification is periodically sent, the standby OLT measures the distance parameter between the standby OLT and each ONU in time, to ensure correctness of a distance parameter stored in the standby OLT.

In a possible implementation, when it is detected that a new ONU is online, the ranging notification is sent to the standby OLT. In this way, the standby OLT measures a distance parameter between the standby OLT and the new ONU in time.

BRIEF DESCRIPTION OF THE DRAWINGS

FIG. 7 is a flowchart of another method applied to a PON system according to an embodiment of this application;

DETAILED DESCRIPTION OF THE EMBODIMENTS

The following further describes in detail embodiments of this application with reference to accompanying drawings.

Figure 1:
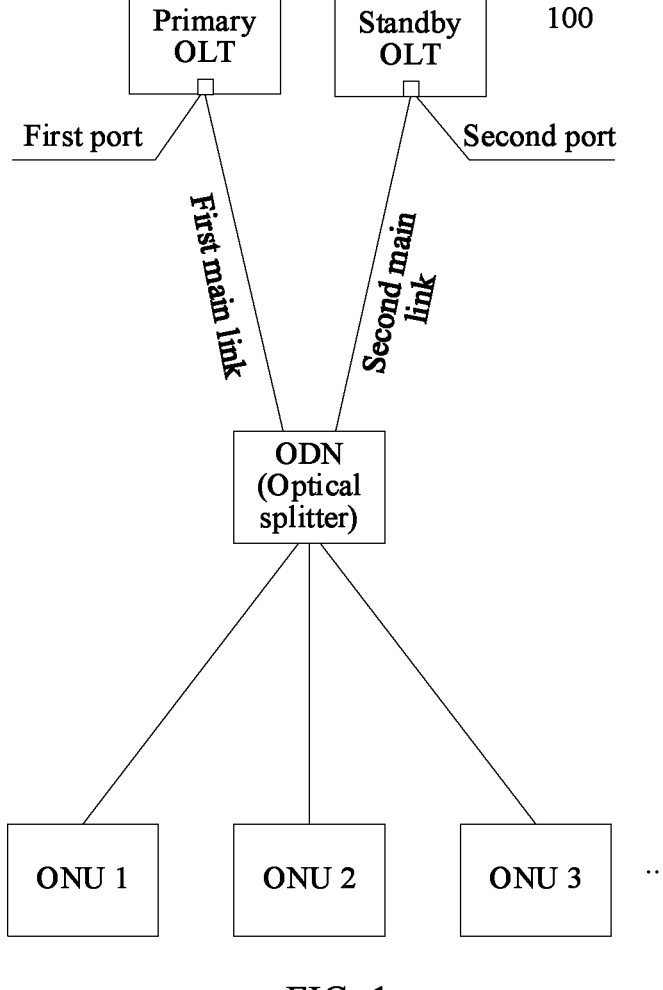
FIG. 1 is a schematic diagram of a structure of a PON system with dual homing protection according to an embodiment of this application.

Refer to FIG. 1. A PON system boo is a communication network using an optical signal as an information transmission carrier. The PON system is a bidirectional optical access network that adopts a point-to-multipoint structure. The PON system includes an OLT located at a central office end, an optical distribution network (ODN), and at least one ONU located on a user side, and the OLT communicates with each ONU through the ODN. In a downlink direction, a signal sent by the OLT reaches each ONU through the ODN. For each ONU, a signal sent by the ONU reaches the OLT through the ODN.

The OLT includes a port, the port on the OLT is connected to the ODN through a main link, and the ODN is connected to each ONU through a branch link. A link between the port on the OLT and the at least one ONU includes a main link between the port on the OLT and the ODN and a branch link between the ODN and the ONU.

The link between the port of the OLT and the at least one ONU is used to carry a channel, the OLT sends a downlink signal to the at least one ONU through the channel, and the at least one ONU sends an uplink signal to the OLT through the channel.

In some embodiments, for the link between the port on the OLT and the at least one ONU, the channels carried on the link include two types of channels, and the two types of channels are respectively a management channel and a service channel. There may be one or more service channels, the management channel and each service channel correspond to a same port on the OLT, and the port includes an optical module corresponding to the management channel and an optical module corresponding to each service channel. The optical module corresponding to the management channel is configured to send a signal and/or receive a signal over the management channel. The optical module corresponding to each service channel is configured to send a signal and/or receive a signal over each service channel.

In some embodiments, the optical module corresponding to the management channel includes a receiver and a transmitter, and the optical module corresponding to each service channel includes a receiver and a transmitter.

In some embodiments, the channel carried on the link is a logical link established on the link. That is, the management channel and each service channel that are carried on the link are both logical links established on the link.

For any two channels of the management channel and the service channels, the two channels may be isolated by using optical wavelengths and/or frequencies corresponding to signals transmitted on the two channels. For example, it is assumed that the two channels include a service channel and a management channel, and an optical wavelength corresponding to a signal transmitted over the management channel is different from an optical wavelength corresponding to a signal transmitted on the service channel, and/or a frequency corresponding to a signal transmitted over the management channel is different from a frequency corresponding to a signal transmitted on the service channel.

The optical wavelength corresponding to the signal transmitted over the management channel includes an optical wavelength corresponding to a first uplink signal and an optical wavelength corresponding to a first downlink signal, and the optical wavelength corresponding to the first uplink signal and the optical wavelength corresponding to the first downlink signal are two different optical signal wavelengths. The optical wavelength corresponding to the signal transmitted on the service channel includes an optical wavelength corresponding to a second uplink signal and an optical wavelength corresponding to a second downlink signal, and the optical wavelength corresponding to the second uplink signal and the optical wavelength corresponding to the second downlink signal are two different optical signal wavelengths.

That an optical wavelength corresponding to a signal transmitted over the management channel is different from an optical wavelength corresponding to a signal transmitted on the service channel means that: The optical wavelength corresponding to the first uplink signal transmitted over the management channel is different from the optical wavelength corresponding to the second uplink signal transmitted on the service channel, and the optical wavelength corresponding to the first downlink signal transmitted over the management channel is different from the optical wavelength corresponding to the second downlink signal transmitted on the service channel.

For another example, it is assumed that the two channels include two service channels, signals transmitted on the two service channels respectively correspond to different optical wavelengths, and/or signals transmitted on the two service channels respectively correspond to different frequencies.

The OLT is configured to manage the at least one ONU by using a management channel. For example, the OLT is configured to perform window open ranging on each of the at least one ONU by using the management channel, and the management channel is used to transmit management data between the OLT and the at least one ONU. For example, when the OLT performs window open ranging on a first ONU, the first ONU is one of the at least one ONU, the OLT sends a ranging request to the first ONU over the management channel, and the first ONU receives the ranging request, and sends a ranging response to the OLT over the management channel. The ranging request and the ranging response are management data transmitted between the OLT and the first ONU. For a service channel between the OLT and the at least one ONU, the service channel is used to transmit service data between the OLT and the at least one ONU.

In a possible implementation, the OLT does not perform ranging on all ONUs in a window for window open once. The OLT sends the ranging request to some ONUs over management channels in the window for window open once. This prevents ranging responses of a plurality of ONUs from reaching the OLT at the same time and prevents a conflict between the ranging responses of the plurality of ONUs.

The management channel between the OLT and the at least one ONU may be a gigabit-capable passive optical network (GPON) channel, an Ethernet passive optical network (EPON) channel, a 10 G symmetrical passive optical network (XGS-PON) channel, or the like. The service channel between the OLT and the at least one ONU may be an XGS-PON channel, a GPON channel, an EPON channel, or the like. For example, when the management channel is a GPON channel, the service channel may be an EPON channel or an XGS-PON channel. Alternatively, when the management channel is an EPON channel, the service channel may be a GPON channel or an XGS-PON channel.

When the management channel is an XGS-PON channel, the service channel may be a GPON channel or an EPON channel.

In some embodiments, the ODN includes one or more optical splitters. The main link and the branch link include an optical fiber and the like. The management channel and the service channel are logical channels.

PON protection technologies include single homing protection and dual homing protection.

Refer to the PON system 100 for implementing the dual homing protection technology shown in FIG. 1. The PON system 100 for implementing the dual homing protection technology includes a primary OLT, a standby OLT, and at least one ONU, and the primary OLT and the standby OLT are two different OLT devices. A link between the primary OLT and the at least one ONU carries a first management channel and at least one first service channel, and a link between the standby OLT and the at least one ONU carries a second management channel and at least one second service channel.

When the main link between the primary OLT and the ODN is normal, the primary OLT performs service data transmission with the at least one ONU through the at least one first service channel, and the primary OLT performs management data transmission with the at least one ONU over the first management channel. When the main link between the primary OLT and the ODN is faulty, a service is switched to the standby OLT, and the standby OLT performs, based on a distance parameter between the standby OLT and each of the at least one ONU, service data transmission with the at least one ONU through the at least one second service channel, and performs management data transmission with the at least one ONU over the second management channel. When the main link between the primary OLT and the ODN is restored to normal, the service is switched to the primary OLT, and the primary OLT performs, based on a distance parameter between the primary OLT and each of the at least one ONU, service data transmission with the at least one ONU through the at least one first service channel, and performs management data transmission with the at least one ONU over the first management channel.

In other words, before the service is switched to the standby OLT, the standby OLT needs to measure the distance parameter between the standby OLT and each ONU. In addition, before the service is switched to the primary OLT, the primary OLT needs to measure the distance parameter between the primary OLT and each ONU.

For the first management channel and the at least one first service channel, a link through which a downlink signal sent by the primary OLT to the first ONU over the first management channel passes is the same as a link through which a downlink signal sent by the primary OLT to the first ONU over the at least one first service channel passes. A link through which an uplink signal sent by the first ONU to the primary OLT over the first management channel passes is the same as a link through which an uplink signal sent by the first ONU to the primary OLT through the at least one first service channel passes. Therefore, a distance parameter between the primary OLT and the first ONU measured by the primary OLT over the first management channel is equal to a distance parameter between the primary OLT and the first ONU measured by the primary OLT on any first service channel, and is equal to a distance parameter between the primary OLT and the first ONU.

Similarly, for the second management channel and the at least one second service channel, a link through which a downlink signal sent by the standby OLT to the first ONU over the second management channel passes is the same as a link through which a downlink signal sent by the standby OLT to the first ONU over the at least one second service channel passes. A link through which an uplink signal sent by the first ONU to the standby OLT over the second management channel passes is the same as a link through which an uplink signal sent by the first ONU to the standby OLT over the at least one second service channel passes. Therefore, a distance parameter between the standby OLT and the first ONU measured by the standby OLT over the second management channel is equal to a distance parameter between the standby OLT and the first ONU measured by the standby OLT on any second service channel, and is equal to a distance parameter between the standby OLT and the first ONU.

Therefore, before the service is switched to the standby OLT, the distance parameter between the standby OLT and each ONU may be measured over the second management channel. In the measurement process, the at least one first service channel is still used to transmit the service data between the primary OLT and each ONU, and/or, before the service is switched to the primary OLT, a distance parameter between the primary OLT and each ONU may be measured over the first management channel. In the measurement process, the at least one second service channel is still used to transmit service data between the standby OLT and each ONU. In this way, impact on service data transmission is avoided.

Refer to FIG. 1. The PON system 100 is a standard PON system architecture. An ODN in the PON system 100 includes an optical splitter. Distance differences of distances between the primary OLT and the standby OLT, and the ONUs are equal, that is, a distance difference between a distance from the primary OLT to a first ONU and a distance from the standby OLT to the first ONU is equal to a distance difference between a distance from the primary OLT to a second ONU and a distance from the standby OLT to the second ONU. The second ONU is any ONU in the at least one ONU other than the first ONU. Therefore, a difference between a distance parameter between the primary OLT and the first ONU and a distance parameter between the standby OLT and the first ONU is equal to a difference between a distance parameter between the primary OLT and the second ONU and a distance parameter between the standby OLT and the second ONU.

Figure 2:
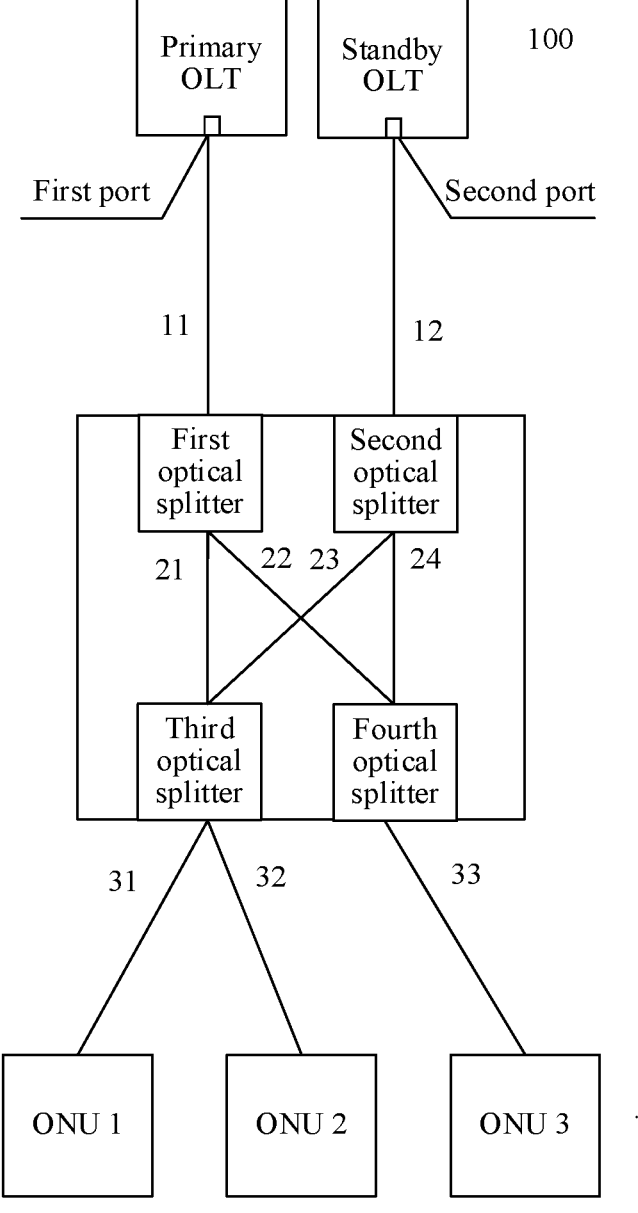
FIG. 2 is a schematic diagram of a structure of another PON system with dual homing protection according to an embodiment of this application.

Optionally, refer to FIG. 2. An ODN in a PON system 100 includes a plurality of optical splitters, and distance differences of distances between a primary OLT and a standby OLT, and ONUs are unequal, that is, a distance difference between a distance from the primary OLT to a first ONU and a distance from the standby OLT to the first ONU may be unequal to a distance difference between a distance from the primary OLT to a second ONU and a distance from the standby OLT to the second ONU. Therefore, a difference between a distance parameter between the primary OLT and the first ONU and a distance parameter between the standby OLT and the first ONU may not equal to a difference between a distance parameter between the primary OLT and the second ONU and a distance parameter between the standby OLT and the second ONU.

For example, refer to FIG. 2. The ODN includes a first optical splitter, a second optical splitter, a third optical splitter, and a fourth optical splitter. The primary OLT is connected to the first optical splitter by using a first main link 11, the first optical splitter is connected to the third optical splitter by using a first branch link 21, and the first optical splitter is connected to the fourth optical splitter by using a second branch link 22. The standby OLT is connected to the second optical splitter by using a second main link 12, the second optical splitter is connected to the third optical splitter by using a third branch link 23, and the second optical splitter is connected to the fourth optical splitter by using a fourth branch link 24. The third optical splitter is connected to an ONU 1 by using a fifth branch link 31, the third optical splitter is connected to an ONU 2 by using a sixth branch link 32, and the fourth optical splitter is connected to an ONU 3 by using a seventh branch link 33.

A distance from the primary OLT to the ONU 1 is equal to an accumulated value of a length L11 of the first main link, a length L21 of the first branch link, and a length L31 of the fifth branch link, that is, L11+L21+L31. A distance from the standby OLT to the ONU 1 is equal to an accumulated value of a length L12 of the second main link, a length L23 of the third branch link, and the length L31 of the fifth branch link, that is, L12+L23+L31. A distance difference between the distance from the primary OLT to the ONU 1 and the distance from the standby OLT to the ONU 1 is L12+L23-L11-L21.

A distance from the primary OLT to the ONU 3 is equal to an accumulated value of the length L11 of the first main link, a length L22 of the second branch link, and a length L33 of the seventh branch link, that is, L11+L22+L33. A distance from the standby OLT to the ONU 3 is equal to an accumulated value of the length L12 of the second main link, a length L24 of the fourth branch link, and the length L33 of the seventh branch link, that is, L12+L24+L33. A distance difference between the distance from the primary OLT to the ONU 3 and the distance from the standby OLT to the ONU 3 is L12+L24-L11-L22. Therefore, the distance difference L12+L23-L11-L21 between the distance from the primary OLT to the ONU 1 and the distance from the standby OLT to the ONU 1 is not equal to the distance difference L12+L24-L11-L22 between the distance from the primary OLT to the ONU 3 and the distance from the standby OLT to the ONU 3.

Figure 3:
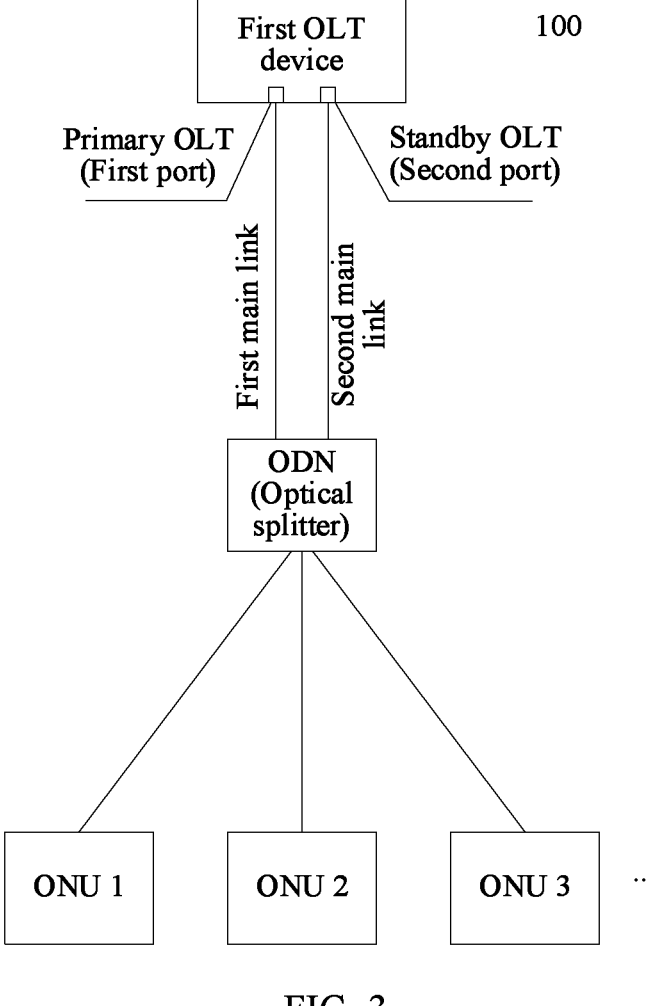
FIG. 3 is a schematic diagram of a structure of a PON system with single homing protection according to an embodiment of this application.

Refer to a PON system 100 for implementing a single homing protection technology shown in FIG. 3. The PON system 100 for implementing a single homing protection technology includes a first OLT device and at least one ONU. A primary OLT and a standby OLT are modules in the first OLT device. The primary OLT includes a first port of the first OLT device, and the standby OLT includes a second port of the first OLT device. The first port is a primary port, and the second port is a standby port.

A link between the first port and the at least one ONU carries a first management channel and at least one first service channel, and a link between the second port and the at least one ONU carries a second management channel and at least one second service channel.

When a main link between the first port and the ODN is normal, the first OLT device performs service data transmission with the at least one ONU through the at least one first service channel, and the first OLT device performs management data transmission with the at least one ONU over the first management channel. When the main link between the first port and the ODN is faulty, the first OLT device switches a service to the second port, and the first OLT device performs, based on a distance parameter between the second port and each of the at least one ONU, service data transmission with the at least one ONU through the at least one second service channel, and performs management data transmission with the at least one ONU over the second management channel. When the main link between the first port and the ODN is restored to normal, the first OLT device switches the service to the first port, and the first OLT device performs, based on a distance parameter between the first port and each of the at least one ONU, service data transmission with the at least one ONU through the at least one first service channel, and performs management data transmission with the at least one ONU over the first management channel.

In other words, before the first OLT device switches the service to the second port, the first OLT device needs to measure the distance parameter between the second port and each ONU. In addition, before the first OLT device switches the service to the first port, the first OLT device needs to measure the distance parameter between the first port and each ONU.

For the first management channel and the at least one first service channel, a link through which a downlink signal sent by the first OLT device to the first ONU over the first management channel passes is the same as a link through which a downlink signal sent by the first OLT device to the first ONU over the at least one first service channel passes. A link through which an uplink signal sent by the first ONU to the first OLT device over the first management channel passes is the same as a link through which an uplink signal sent by the first ONU to the first OLT device through the at least one first service channel passes. Therefore, a distance parameter between the first OLT device and the first ONU that is measured by the first OLT device over the first management channel is equal to a distance parameter between the first OLT device and the first ONU that is measured by the first OLT device on any first service channel, and is equal to a distance parameter between the first port and the first ONU.

Similarly, for the second management channel and the at least one second service channel, a link through which a downlink signal sent by the first OLT device to the first ONU over the second management channel passes is the same as a link through which a downlink signal sent by the first OLT device to the first ONU over the at least one second service channel passes. A link through which an uplink signal sent by the first ONU to the first OLT device over the second management channel passes is the same as a link through which an uplink signal sent by the first ONU to the first OLT device through the at least one second service channel passes. Therefore, a distance parameter between the first OLT device and the first ONU that is measured by the first OLT device over the second management channel is equal to a distance parameter between the first OLT device and the first ONU that is measured by the first OLT device on any second service channel, and is equal to a distance parameter between the second port and the first ONU.

Therefore, before the service is switched to the second port, the distance parameter between the second port and each ONU may be measured over the second management channel. In the measurement process, the at least one first service channel is still used to transmit the service data between the first port and each ONU, and/or, before the service is switched to the first port, a distance parameter between the first port and each ONU may be measured over the first management channel. In a measurement process, the second service channel is still used to transmit service data between the second port and each ONU. In this way, impact on service data transmission is avoided.

Refer to FIG. 3. A PON system 100 is a standard PON system architecture. An ODN in the PON system 100 includes an optical splitter. Distance differences of distances between a first port and a second port, and ONUs are equal, that is, a distance difference between a distance from the first port to a first ONU and a distance from the second port to the first ONU is equal to a distance difference between a distance from the first port to a second ONU and a distance from the second port to the second ONU. The second ONU is any ONU in the at least one ONU other than the first ONU. Therefore, a difference between a distance parameter between the first port and the first ONU and a distance parameter between the second port and the first ONU is equal to a difference between a distance parameter between the first port and the second ONU and a distance parameter between the second port and the second ONU.

Figure 4:
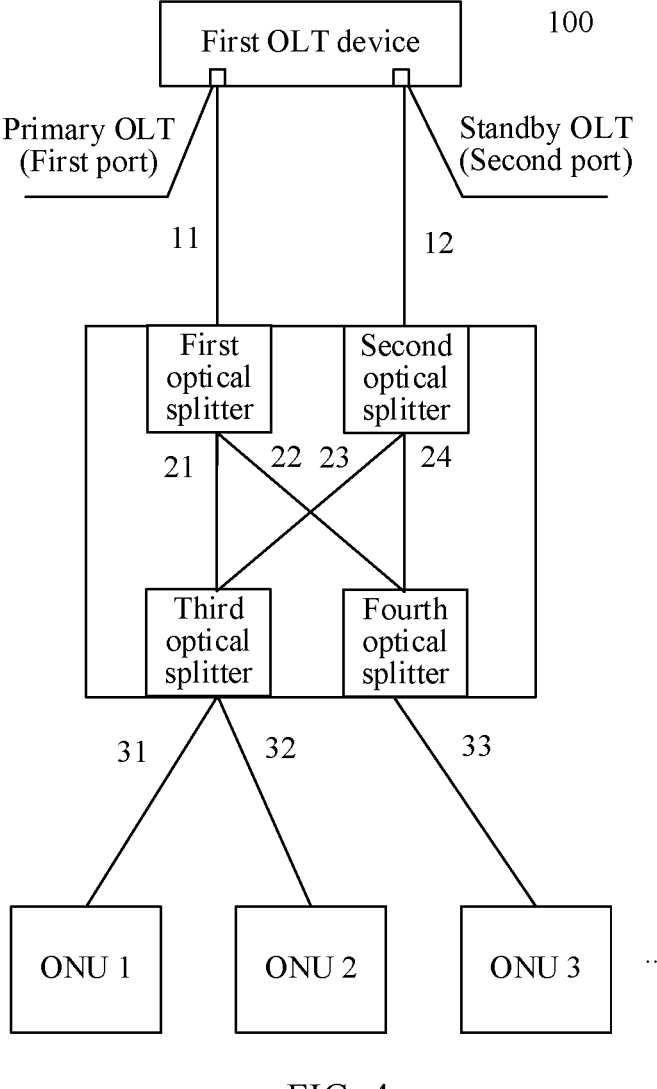
FIG. 4 is a schematic diagram of a structure of another PON system with single homing protection according to an embodiment of this application.

Optionally, refer to FIG. 4. An ODN in a PON system 100 includes a plurality of optical splitters. Distance differences of distances between a first port and a second port, and ONUs are not equal, that is, a distance difference between a distance from the first port to a first ONU and a distance from the second port to the first ONU is not equal to a distance difference between a distance from the first port to a second ONU and a distance from the second port to the second ONU. Therefore, a difference between a distance parameter between the first port and the first ONU and a distance parameter between the second port and the first ONU may not equal to a difference between a distance parameter between the first port and the second ONU and a distance parameter between the second port and the second ONU.

For example, refer to FIG. 4. The ODN includes a first optical splitter, a second optical splitter, a third optical splitter, and a fourth optical splitter. The first port is connected to the first optical splitter by using a first main link 11, the first optical splitter is connected to the third optical splitter by using a first branch link 21, and the first optical splitter is connected to the fourth optical splitter by using a second branch link 22. The second port is connected to the second optical splitter by using a second main link 12, the second optical splitter is connected to the third optical splitter by using a third branch link 23, and the second optical splitter is connected to the fourth optical splitter by using a fourth branch link 24. The third optical splitter is connected to an ONU 1 by using a fifth branch link 31, the third optical splitter is connected to an ONU 2 by using a sixth branch link 32, and the fourth optical splitter is connected to an ONU 3 by using a seventh branch link 33.

A distance from the first port to the ONU 1 is equal to an accumulated value of a length $L11$ of the first main link, a length $L21$ of the first branch link, and a length $L31$ of the fifth branch link, that is, $L11+L21+L31$. A distance from the second port to the ONU 1 is equal to an accumulated value of a length $L12$ of the second main link, a length $L23$ of the third branch link, and the length $L31$ of the fifth branch link, that is, $L12+L23+L31$. A distance difference between the distance from the first port to the ONU 1 and the distance from the second port to the ONU 1 is $L12+L23-L11-L21$.

A distance from the first port to the ONU 3 is equal to an accumulated value of the length $L11$ of the first main link, a length $L22$ of the second branch link, and a length $L33$ of the seventh branch link, that is, $L11+L22+L33$. A distance from the second port to the ONU 3 is equal to an accumulated value of the length $L12$ of the second main link, a length $L24$ of the fourth branch link, and the length $L33$ of the seventh branch link, that is, $L12+L24+L33$. The distance difference between the distance from the first port to the ONU 3 and the distance from the second port to the ONU 3 is $L12+L24-L11-L22$. Therefore, the distance difference $L12+L23-L11-L21$ between the distance from the first port to the ONU 1 and the distance from the second port to the ONU 1 is not equal to the distance difference L12+L24–L11–L22 between the distance from the first port to the ONU 3 and the distance from the second port to the ONU 3.

Figure 5:
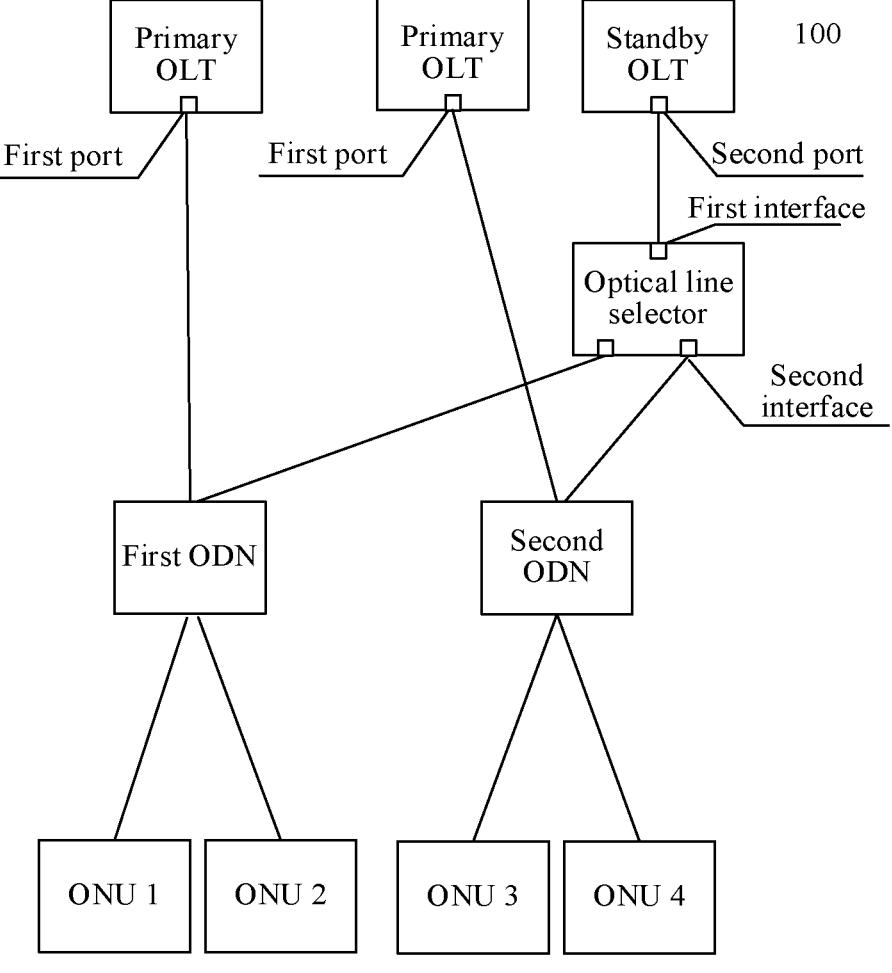
FIG. 5 is a schematic diagram of a structure of a 1:N protection network according to an embodiment of this application.

Refer to FIG. 5. A standby OLT further communicates with an optical line selector, or a standby OLT included in a first OLT device further communicates with an optical line selector, so as to form 1:N protection networking, where N is an integer greater than or equal to 1, and the protection networking includes one standby OLT and N primary OLTs. A primary OLT is selected from the N primary OLTs by using the optical line selector, where the selected primary OLT and the standby OLT form a PON system 100 using a single homing protection technology or a PON system 100 using a dual homing protection technology.

The optical line selector includes a first interface and a plurality of second interfaces, and the standby OLT (or the standby OLT in the first OLT device) communicates with the first interface of the optical line selector. Each second interface of the optical line selector corresponds to one ODN. For ease of description, any ODN is referred to as a first ODN, the first ODN is corresponding to one second interface on the optical line selector, and a communication connection exists between the first ODN and the second interface. The first ODN further communicates with one primary OLT and at least one ONU.

When the optical line selector turns on the first interface and the second interface, the standby OLT, the primary OLT communicating with the first ODN, and the at least one ONU form a PON system using a single homing protection technology or a PON system using a dual homing protection technology. When the standby OLT and the primary OLT communicating with the first ODN are two different OLT devices, a formed PON system is the PON system using a dual homing protection technology. When the standby OLT and the primary OLT communicating with the first ODN are two different modules in the first OLT device, a formed PON system is the PON system using a single homing protection technology.

Figure 6:
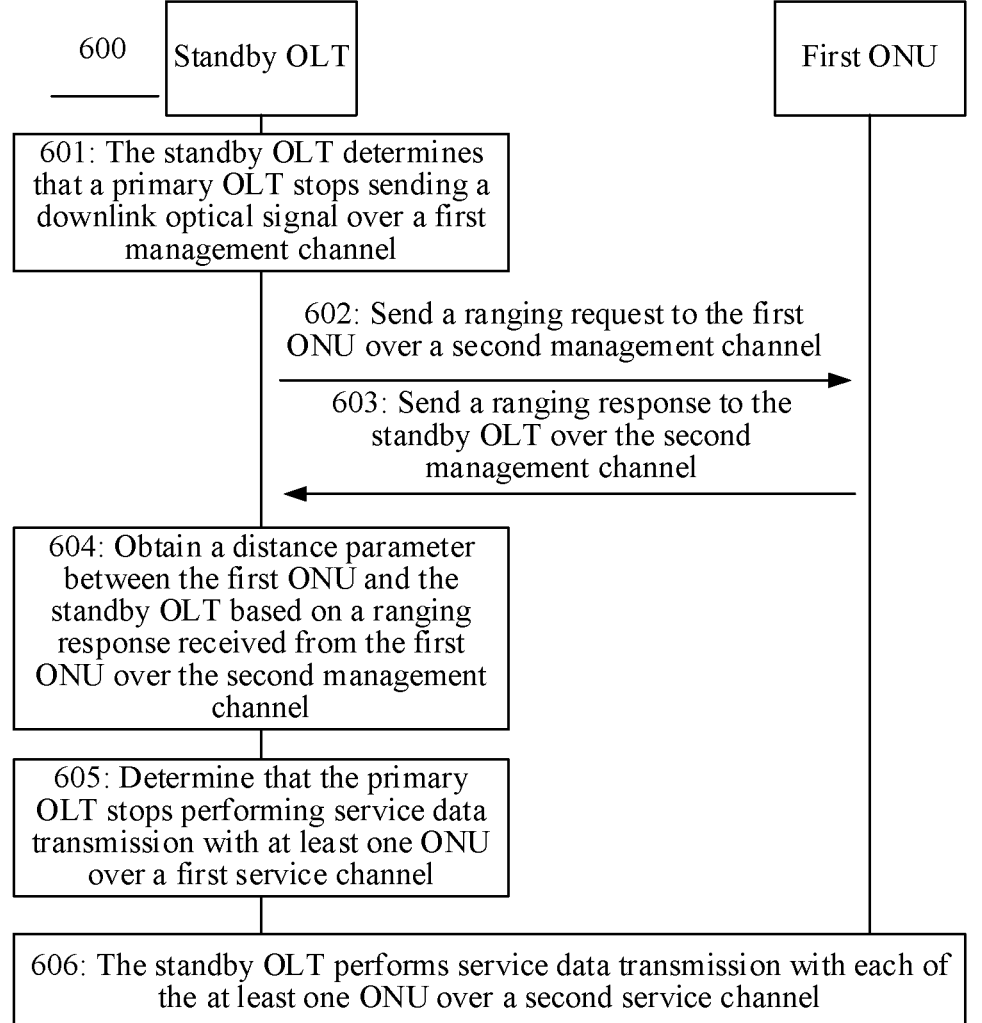
FIG. 6 is a flowchart of a method applied to a PON system according to an embodiment of this application.

Refer to FIG. 6. This application provides a method 600 applied to a PON system. The PON system may be the PON system 100 in the dual homing protection technology shown in FIG. 1 or FIG. 2, or may be the PON system 100 in the single homing protection technology shown in FIG. 3 or FIG. 4, or may be a PON system combined with an optical line selector in FIG. 5. The PON system includes a primary OLT, a standby OLT, and at least one ONU. The primary OLT and the standby OLT communicate with the at least one ONU by using a first ODN. The method boo includes the following steps.

Step 601: The standby OLT determines that the primary OLT stops sending a downlink optical signal over a first management channel.

The primary OLT periodically triggers the standby OLT to measure a distance parameter between the standby OLT and each of the at least one ONU. Alternatively, when detecting that a new ONU registers with the primary OLT and is online, the primary OLT triggers the standby OLT to measure a distance parameter between the standby OLT and each of the at least one ONU.

When it is determined to trigger the standby OLT to measure the distance parameter between the standby OLT and each ONU, the primary OLT stops sending the downlink optical signal over the first management channel.

In some embodiments, the primary OLT includes a first port, and the first port includes a function of sending a downlink optical signal over the first management channel and a function of sending a downlink optical signal over at least one first service channel. The primary OLT disables the function of sending a downlink optical signal over the first management channel included in the first port, so as to stop sending the downlink optical signal over the first management channel.

In some embodiments, the primary OLT and the standby OLT are two modules in a first OLT device. Therefore, when the first OLT device disables the function of sending a downlink optical signal over the first management channel by the primary OLT, it may be determined that the primary OLT stops sending the downlink optical signal over the first management channel.

In some embodiments, when the primary OLT and the standby OLT are two different devices, the primary OLT sends a ranging notification to the standby OLT when stopping sending the downlink optical signal over the first management channel, and the ranging notification indicates the standby OLT to perform ranging. For a message name of the ranging notification, the message name is merely an example of this embodiment of this application, and may also be referred to as another name, for example, may also be referred to as a ranging indication.

In this way, in step 601, the standby OLT receives the ranging notification sent by the primary OLT, and determines, based on the ranging notification, that the primary OLT stops sending the downlink signal over the first management channel. Alternatively, the standby OLT receives the ranging notification sent by the primary OLT, detects, based on an indication of the ranging notification, an uplink optical signal received over a second management channel, and when strength of the detected uplink optical signal is lower than a first threshold, determines that the primary OLT stops sending the downlink optical signal over the first management channel.

The primary OLT sends a downlink optical signal to each ONU over the first management channel, and each ONU receives the downlink optical signal, and sends an uplink optical signal over the first management channel in response to the downlink optical signal. After the primary OLT stops sending the downlink optical signal over the first management channel, each ONU does not send the uplink optical signal over the first management channel either.

The first management channel is carried on a link between the primary OLT and each ONU, and the second management channel is carried on a link between the standby OLT and each ONU. The link between the primary OLT and each ONU includes a main link between the primary OLT and the first ODN and a branch link between the first ODN and each ONU, and the link between the standby OLT and each ONU includes a main link between the standby OLT and the first ODN and a branch link between the first ODN and each ONU. Therefore, each ONU does not send the uplink optical signal over the first management channel and not send the uplink optical signal over the second management channel. Therefore, the standby OLT detects the uplink optical signal received over the second management channel, and the detected strength of the uplink optical signal is lower than the first threshold.

In some embodiments, before the primary OLT determines to trigger the standby OLT to measure the distance parameter between the standby OLT and each ONU, the standby OLT also detects an uplink optical signal received over the second management channel and/or a second service channel. If detected strength of the uplink optical signal is greater than or equal to the first threshold, it indicates that a link is connected between the standby OLT and the at least one ONU. If detected strength of the uplink optical signal is lower than the first threshold, it indicates that there may be no link connected between the standby OLT and the at least one ONU, and a skilled person is prompted to perform maintenance.

The primary OLT uses the at least one first service channel to perform service data transmission with the at least one ONU. In a process of transmitting the service data, the at least one ONU sends an uplink optical signal over at least one first service channel and at least one second service channel at the same time, so that the standby OLT receives the uplink optical signal through the at least one second service channel.

In addition, before the primary OLT determines to trigger the standby OLT to measure the distance parameter between the standby OLT and each ONU, the primary OLT performs management data transmission with the at least one ONU. In a management data transmission process, the at least one ONU sends an uplink optical signal over the first management channel and the second management channel at the same time, so that the standby OLT receives the uplink optical signal over the second management channel.

Before step 601 is performed, the standby OLT further controls the optical line selector to turn on a communication connection between the standby OLT and the first ODN. During implementation, the standby OLT controls the optical line selector to connect the first interface and a second interface corresponding to the first ODN.

Because a communication connection exists between the standby OLT and the first interface of the optical line selector, and a communication connection exists between the first ODN and the second interface corresponding to the first ODN, when the first interface is connected to the second interface corresponding to the first ODN, the communication connection between the standby OLT and the first ODN is turned on. The first ODN further communicates with one primary OLT and at least one ONU, so that a standby OLT, the primary OLT, and the at least one ONU form a PON system.

In this embodiment of this application, the PON may be a PON in a dual homing protection technology. Therefore, the primary OLT and the standby OLT in this embodiment of this application are two different OLT devices. Alternatively, the PON may be a PON in a single homing protection technology. Therefore, the primary OLT and the standby OLT in this embodiment of this application are two modules in a first OLT device.

Step 602: The standby OLT sends a ranging request to a first ONU over a second management channel, where the first ONU is one of the at least one ONU.

The standby OLT includes a second port, the second port includes a function of sending a downlink optical signal over the second management channel and a function of sending a downlink optical signal over the second service channel. The standby OLT enables a function of sending a downlink optical signal over the second management channel included in the second port, and then the standby OLT sends a ranging request to the first ONU over the second management channel, and the ranging request is included in the downlink optical signal.

In step 602, the standby OLT further obtains a first sending time stamp, where the first sending time stamp is a time stamp for the standby OLT to send the ranging request.

In some embodiments, the standby OLT includes a first time stamp counter. When sending the ranging request, the standby OLT reads a value of the first time stamp counter as the first sending time stamp.

Before sending the ranging request to the first ONU, the standby OLT further sends a window open indication to the first ONU over the second management channel, and the window open indication indicates a ranging window for performing ranging on the first ONU. Within the ranging window, the standby OLT sends the ranging request to the first ONU over the second management channel.

After the standby OLT sends the window open indication, each of the at least one ONU receives the window open indication over the second management channel, and determines, based on the window open indication, the ranging window for performing ranging on the first ONU. For another ONU other than the first ONU, the another ONU does not send an uplink optical signal over the second management channel within the ranging window. The first ONU communicates with the standby OLT over the second management channel within the ranging window.

In some embodiments, the window open indication includes an identifier of the first ONU and configuration information of the ranging window, so that the window open indication indicates a ranging window for ranging the first ONU. The configuration information includes a start time and an end time of the ranging window, or the configuration information includes a start time and duration of the ranging window, or the configuration information includes an end time and duration of the ranging window, and the like.

In some embodiments, after the standby OLT enables the function of sending a downlink optical signal over the second management channel included in the second port, each ONU registers with the standby OLT over the second management channel. A registration process is: the standby OLT sends a serial number request message to each of the at least one ONU over the second management channel. Each ONU receives the serial number request message, and sends a serial number of each ONU to the standby OLT over the second management channel. The standby OLT receives the serial number of each ONU, allocates an identifier to each ONU based on the serial number of each ONU, and sends the identifier of each ONU to each ONU. Then, the operation in step 602 is performed.

In some embodiments, after enabling the function of sending a downlink optical signal over the second management channel included in the second port, the standby OLT does not perform the foregoing registration process, but directly performs the operation in step 602 to perform ranging on each ONU.

It should be noted that: the primary OLT disables the function of sending a downlink optical signal over the first management channel included in the first port, so as to stop sending the downlink optical signal over the first management channel. In this case, each ONU is online and offline from the primary OLT over the first management channel. When the primary OLT stops sending the downlink optical signal over the first management channel, and the standby OLT enables the function of sending a downlink optical signal over the second management channel included in the second port, the standby OLT enables each ONU to be online from the standby OLT over the second management channel using the foregoing registration process. After registration succeeds, the standby OLT performs ranging on each ONU, that is, starts to perform the operation in step 602 to perform ranging on each ONU.

In some embodiments, after the standby OLT enables the function of sending a downlink optical signal over the second management channel included in the second port, each ONU is online from the standby OLT over the second management channel without using the foregoing registration process. Because each ONU has been registered with the primary OLT, the standby OLT obtains the identifier of each ONU from the primary OLT, and then performs the operation in step 602 to perform ranging on each ONU.

In some embodiments, the first ONU is a new online ONU, that is, the standby OLT performs ranging on the new online ONU. For ONUs on which ranging are performed last time, the standby OLT may not perform ranging on these ONUs any more. The standby OLT may query the primary OLT for the ONU that is newly online, or the standby OLT receives an identifier of the ONU that is newly online that is sent by the primary OLT, or the standby OLT compares each currently registered ONU with each previously registered ONU to obtain the ONU that is newly online.

Step 603: The first ONU receives the ranging request over the second management channel, and sends a ranging response to the standby OLT over the second management channel.

The ranging response includes a second sending time stamp and a first receiving time stamp, and the first receiving time stamp is a time stamp for the first ONU to receive the ranging request, and the second sending time stamp is a time stamp for the first ONU to send the ranging response.

In some embodiments, the first ONU includes a second time stamp counter. When receiving the ranging request, the first ONU reads count value of the second time stamp counter as the first receiving time stamp. When it is determined to send the ranging response, the first ONU reads count value of the second time stamp counter as the second sending time stamp.

A counting frequency of the first time stamp counter is the same as a counting frequency of the second time stamp counter.

Step 604: The standby OLT obtains a distance parameter between the first ONU and the standby OLT based on the ranging response received from the first ONU over the second management channel.

In step 604, the standby OLT receives, over the second management channel, the ranging response sent by the first ONU, obtains a second receiving time stamp, where the second receiving time stamp is a time stamp for the ranging response to be received, and obtains the distance parameter between the standby OLT and the first ONU based on the first sending time stamp, the second sending time stamp, the first receiving time stamp, and the second receiving time stamp.

In some embodiments, when receiving the ranging response, the first ONU reads a count value of the first time stamp counter as the second receiving time stamp.

In some embodiments, when the second management channel is a GPON channel, the distance parameter includes an equalization delay (EQD). When the second management channel is an EPON channel, the distance parameter includes a round-trip time (RTT).

In some embodiments, the standby OLT further measures an optical signal corresponding to the ranging response, and determines signal quality corresponding to the first ONU.

In some embodiments, the signal quality includes one or more of received optical power, a received signal strength indication (RSSI), optical signal strength, and the like.

In some embodiments, the procedures of the foregoing steps 602 to 604 are performed on each of the at least one ONU, so that the standby OLT obtains the distance parameter between the standby OLT and each ONU. Because environment of the ONU may change, a distance between the ONU and the standby OLT may change. Therefore, the standby OLT measures the distance parameter between the standby OLT and each ONU.

In some embodiments, the foregoing PON system is a standard PON system architecture shown in FIG. 1 or FIG. 3. In the PON system, a distance difference between each ONU and the primary OLT and a distance difference between each ONU and the standby OLT are equal, that is, a distance difference between a distance from the primary OLT to a first ONU and a distance from the standby OLT to the first ONU is equal to a distance difference between a distance from the primary OLT to a second ONU and a distance from the standby OLT to the second ONU, and the second ONU is any ONU in the PON system other than the first ONU. In this case, the standby OLT obtains a distance parameter between the primary OLT and each ONU, and performs ranging on the first ONU to obtain the distance parameter between the standby OLT and the first ONU, obtains a distance parameter difference based on the distance parameter between the primary OLT and the first ONU and the distance parameter between the standby OLT and the first ONU, and obtains a distance parameter between the standby OLT and the second ONU based on the distance parameter difference and a distance parameter between the primary OLT and the second ONU. In this way, the standby OLT does not need to perform window open ranging on each ONU, to not only reduce resources required for ranging, but also quickly obtain the distance parameter between the standby OLT and each ONU, so as to improve ranging efficiency.

In some embodiments, when the primary OLT and the standby OLT are two different devices, the standby OLT obtains the distance parameter between the primary OLT and each ONU from the primary OLT.

In some embodiments, the standby OLT further obtains signal quality corresponding to each ONU by performing the foregoing steps 602 to 604, and determines a status of a main link based on the signal quality corresponding to each ONU, and the main link is a shared part of links between the standby OLT and each ONU.

In some embodiments, when the status of the main link is a faulty status, the standby OLT prompts a skilled person to perform maintenance.

It should be noted that in a process in which the standby OLT measures the distance parameter between the standby OLT and each ONU over the second management channel, the primary OLT still performs service data transmission with each ONU over the first service channel. In this way, in a process of measuring the distance parameter between the standby OLT and each ONU, transmission of service data is not interrupted.

In a process in which the standby OLT uses the second management channel to measure the distance parameter between the standby OLT and each ONU, the primary OLT can also receive an uplink optical signal from the first management channel, but the primary OLT does not process the uplink optical signal.

In some embodiments, after obtaining the distance parameter between the standby OLT and the first ONU, the standby OLT stores the distance parameter between the standby OLT and the first ONU, and/or the standby OLT sends the distance parameter between the standby OLT and the first ONU to the first ONU, and the first ONU stores the distance parameter between the standby OLT and the first ONU.

In some embodiments, when both the first management channel and the second management channel are GPON channels, the distance parameter between the standby OLT and the first ONU includes an equalization delay, and the standby OLT sends the equalization delay to the first ONU.

Actual distances between the standby OLT and the ONUs may be different, causing different actual round-trip transmission delays between the standby OLT and the ONUs. The standby OLT is corresponding to a distance threshold, and the distance threshold is greater than or equal to a maximum value of actual distances between the standby OLT and the ONUs.

The first ONU receives the equalization delay between the standby OLT and the first ONU, and may compensate for an actual round-trip transmission delay between the standby OLT and the first ONU based on the equalization delay. A round-trip transmission delay obtained after compensation is equal to a round-trip transmission delay corresponding to the distance threshold. The round-trip transmission delay corresponding to the distance threshold is a round-trip transmission delay of an optical signal over a link whose length is equal to the distance threshold. Similar to the first ONU, each of the other ONUs compensates for an actual round-trip time between the other ONU and the standby OLT, so that a round-trip time between the standby OLT and each ONU is changed to a round-trip time corresponding to the distance threshold.

The equalization delay between the standby OLT and the first ONU is used to compensate for the actual round-trip transmission delay between the standby OLT and the first ONU, or may be considered as compensation for an actual distance between the standby OLT and the first ONU, to obtain a logical distance between the standby OLT and the first ONU, where the logical distance is equal to a distance threshold corresponding to the standby OLT. Therefore, an actual distance between the standby OLT and each ONU is compensated by using an equalization delay between the standby OLT and each ONU, so that the logical distance between the standby OLT and each ONU is equal to the distance threshold corresponding to the standby OLT. In this way, round-trip transmission delays between the standby OLT and the ONUs are the same.

After the standby OLT measures the distance parameter between the standby OLT and each ONU, the standby OLT stops sending the downlink optical signal over the second management channel. Correspondingly, the primary OLT sends the downlink optical signal over the first management channel, so as to transmit the management data to each ONU over the first management channel.

In some embodiments, the standby OLT disables the function of sending a downlink optical signal over the second management channel included in the second port, so as to stop sending the downlink optical signal over the second management channel. The standby OLT enables the function of sending a downlink optical signal over the first management channel by the first port, to send the downlink optical signal over the first management channel.

When the primary OLT and the standby OLT are two different OLT devices, after measuring the distance parameter between the standby OLT and each ONU, the standby OLT sends a ranging completion notification to the primary OLT. After receiving the ranging completion notification, the primary OLT transmits the management data to each ONU over the first management channel.

When a main link between the primary OLT and the first ODN is faulty, a service needs to be switched from the primary OLT to the standby OLT, and an operation of the following step 605 is performed, and/or, the skilled person switches the service from the primary OLT to the standby OLT, and the operation of the following step 605 is started.

Step 605: The standby OLT determines that the primary OLT stops performing service data transmission with the at least one ONU over the first service channel.

At least one first service channel exists between the primary OLT and the at least one ONU, and at least one second service channel exists between the standby OLT and the at least one ONU.

When one first service channel exists between the primary OLT and the at least one ONU, and one second service channel exists between the standby OLT and the at least one ONU, in step 605, the standby OLT detects an uplink optical signal received over the second service channel; and when detecting that strength of the uplink optical signal is lower than a first threshold, determines that the primary OLT stops sending a downlink optical signal over the first service channel.

When a plurality of first service channels exist between the primary OLT and the at least one ONU, and a plurality of second service channels exist between the standby OLT and the at least one ONU, in step 605, the standby OLT detects an uplink optical signal received through the plurality of second service channels; and when detecting that strength of the uplink optical signal over each second service channel is lower than a first threshold, determines that the primary OLT stops sending a downlink optical signal over the plurality of first service channels.

In a process in which the primary OLT performs service data transmission with the at least one ONU, the primary OLT sends a downlink optical signal to each ONU over any first service channel, and each ONU receives the downlink optical signal, and sends an uplink optical signal over the any first service channel in response to the downlink optical signal. After the primary OLT stops sending the downlink optical signal over the any first service channel, each ONU does not send the uplink optical signal over the any first service channel either.

The at least one first service channel is carried on a link between the primary OLT and each ONU, and the at least one second service channel is carried on a link between the standby OLT and each ONU. The link between the primary OLT and each ONU includes the main link between the primary OLT and the first ODN and the branch link between the first ODN and each ONU, and the link between the standby OLT and each ONU includes the main link between the standby OLT and the first ODN and the branch link between the first ODN and each ONU. Therefore, each ONU does not send an uplink optical signal over the at least one first service channel, and does not send an uplink optical signal over the at least one second service channel at the same time. The standby OLT detects the uplink optical signal received through the at least one second service channel, and detects that the strength of the uplink optical signal over each second service channel is lower than the first threshold, to determine that the primary OLT stops sending the downlink optical signal over the at least one first service channel.

In some embodiments, when it is determined that the primary OLT stops performing service data transmission with the at least one ONU over the at least one first service channel, the standby OLT sends an OLT switching indication to each of the at least one ONU over any second service channel, where the OLT switching indication indicates each ONU to perform service data transmission with the standby OLT over the at least one second service channel. Each ONU receives the OLT switching indication, and prepares to use the distance parameter between the ONU and the standby OLT to transmit service data.

Step 606: The standby OLT performs service data transmission with each of the at least one ONU over the second service channel.

In step 606, the standby OLT may perform service data transmission with each of the at least one ONU in the following two manners. The two manners are respectively as follows.

In a first manner, for any second service channel of the at least one second service channel, the standby OLT performs service data transmission with the at least one ONU over the second service channel based on the distance parameter between each of the at least one ONU and the standby OLT.

In some embodiments, when the second service channel is an EPON channel, the distance parameter between the standby OLT and each ONU is an equalization delay, and the standby OLT may implement the first manner by using the following operations (1-1) to (1-3). The operations of (1-1) to (1-3) are respectively as follows:

> (1-1): The standby OLT obtains, based on the distance parameter between each ONU and the standby OLT, configuration information of a sending slot corresponding to each ONU.

In the operation of (1-1), the standby OLT allocates a slot to each ONU by using a start time of a current sending period as a reference, and slots corresponding to any two ONUs do not overlap. The slot of each ONU is adjusted based on the equalization delay between the standby OLT and each ONU, to obtain the sending slot corresponding to each ONU.

For example, it is assumed that a slot allocated by the standby OLT to the first ONU is a time period from t1 to t2, and an equalization delay between the standby OLT and the first ONU is Δt. The standby OLT adjusts the slot of the first ONU, to obtain a time period in which a sending slot corresponding to the first ONU is a time period from Δt+t1 to Δt+t2.

For a sending slot corresponding to any ONU, configuration information of the sending slot includes a start time and an end time of the sending slot.

> (1-2): The standby OLT sends, to each ONU over the second service channel, the configuration information of the sending slot corresponding to the ONU.

In the operation of (1-2), the standby OLT sends, to each ONU at a start time of one sending period, the configuration information of the sending slot corresponding to the ONU. The standby OLT determines a receive window based on the distance threshold corresponding to the standby OLT, where a time difference between a start time of the receive window and the start time of the sending period is determined based on the distance threshold corresponding to the standby OLT. Duration of the receive window is greater than or equal to an accumulated value of duration of sending slots corresponding to ONUs.

For each of the at least one ONU, for example, the first ONU, the first ONU receives, over the second service channel, configuration information of a sending slot corresponding to the first ONU, determines, based on the configuration information, the sending slot corresponding to the first ONU, and sends service data in the sending slot corresponding to the first ONU over the second service channel.

Like the first ONU, each of the other ONUs sends service data in a corresponding sending slot.

> (1-3): The standby OLT receives the service data over the second service channel.

The standby OLT receives, in the receive window over the second service channel, the service data sent by each ONU.

Each ONU sends the service data in the sending slot corresponding to each ONU. The service data arrives at the standby OLT in different time periods and is received by the standby OLT. That is, no conflict occurs during transmission of the service data of each ONU.

In some embodiments, when the second service channel is a GPON channel, a distance difference between a distance from the standby OLT to a first ONU and a distance from the primary OLT to the first ONU is equal to a distance difference between a distance from the standby OLT to a second ONU and a distance from the primary OLT to the second ONU, and the second ONU is any ONU except the first ONU. That is, the first ODN is a standard ODN in the PON system shown in FIG. 1 or FIG. 3. The distance parameter between the standby OLT and each ONU is a round-trip time, and the standby OLT may implement the first manner by using the following operations (2-1) to (2-3). The operations of (2-1) to (2-3) are respectively as follows:

> (2-1): The standby OLT obtains a compensation delay based on the distance parameter between the standby OLT and the first ONU and the distance parameter between the primary OLT and the first ONU.

When the standby OLT and the primary OLT are two different modules in the first OLT device, the standby OLT (that is, the first OLT device) includes the distance parameter between the primary OLT and each ONU. When the standby OLT and the primary OLT are two different OLT devices, the standby OLT receives in advance the distance parameter between the primary OLT and each ONU that is sent by the primary OLT.

Likewise, for any ONU, that is, for the first ONU, the first ONU also includes the distance parameter between the primary OLT and the first ONU.

It should be noted that the standby OLT allocates a sending slot to each ONU by using a start time of a current sending period as a reference, and sending slots corresponding to any two ONUs do not overlap. The standby OLT sends, to each ONU over the second service channel at the start time of the sending period, configuration information of the sending slot corresponding to each ONU.

The standby OLT further determines a first receive window based on the distance threshold corresponding to the primary OLT, where a time difference between a start time of the first receive window and the start time of the sending period is determined based on the distance threshold corresponding to the primary OLT. Duration of the first receive window is greater than or equal to an accumulated value of duration of sending slots corresponding to the ONUs.

For a sending slot corresponding to any ONU, configuration information of the sending slot includes a start time and an end time of the sending slot.

For any ONU, that is, for the first ONU, the first ONU receives configuration information of a sending slot corresponding to the first ONU, and determines, based on the configuration information, the sending slot corresponding to the first ONU, adjusts the sending slot based on the distance parameter between the first ONU and the primary OLT, and sends service data over the second service channel in the adjusted sending slot.

For example, it is assumed that the sending slot allocated by the standby OLT to the first ONU is a time period from t1 to t2, and the distance parameter between the primary OLT and the first ONU is Δt, and the first ONU includes the distance parameter Δt. The first ONU receives the configuration information that is of the sending slot corresponding to the first ONU and that is sent by the standby OLT, determines, based on the configuration information, that the sending slot is the time period from t1 to t2, adjusts the sending slot based on Δt, where the adjusted sending slot is a time period from Δt+t1 to Δt+t2, and sends the service data over the second service channel in the adjusted sending slot.

(2-2): The standby OLT adjusts the first receive window based on the compensation delay, to obtain a second receive window.

Each ONU adjusts the sending slot corresponding to each ONU by using the distance parameter between the ONU and the primary OLT, and a distance difference exists between a distance from the primary OLT to any ONU and a distance from the standby OLT to the ONU. Therefore, the first receive window needs to be adjusted to obtain the second receive window.

(2-3): The standby OLT receives the service data in the second receive window over the second service channel.

Each ONU sends the service data in the sending slot corresponding to each ONU. The service data arrives at the standby OLT in different time periods and is received by the standby OLT. That is, no conflict occurs during transmission of the service data of each ONU.

In a second manner, for any one of the at least one second service channel, the standby OLT sends the distance parameter between the standby OLT and each ONU to each ONU. The standby OLT allocates a sending slot to each ONU, and sends, to each ONU over the second service channel, configuration information of the sending slot corresponding to each ONU. Then, the service data that is sent by each ONU in the sending slot corresponding to each ONU is received over the second service channel.

If the distance parameter between the standby OLT and each ONU is already sent to each ONU when the distance parameter between the standby OLT and each ONU is measured, in the second manner, the standby OLT may not need to send the distance parameter.

In the second manner, the standby OLT allocates a sending slot to each ONU by using a start time of a current sending period as a reference, and sending slots corresponding to any two ONUs do not overlap. The standby OLT sends, to each ONU over the second service channel at the start time of the sending period, the configuration information of the sending slot corresponding to the ONU. The standby OLT further determines a receive window based on the distance threshold corresponding to the standby OLT, where duration of the receive window is greater than or equal to an accumulated value of duration sending slots corresponding to the ONUs.

For any ONU, that is, for the first ONU, the first ONU receives configuration information of a sending slot corresponding to the first ONU, and determines, based on the configuration information, the sending slot corresponding to the first ONU, adjusts the sending slot based on the distance parameter between the first ONU and the primary OLT, and sends service data over the second service channel in the adjusted sending slot. The standby OLT receives, in the receive window over the second service channel, the service data sent by each ONU.

In this embodiment of this application, before the standby OLT performs service data transmission with each ONU over the second service channel, that is, before the service is switched to the standby OLT, the primary OLT stops sending the downlink optical signal over the first management channel. In this way, the standby OLT may measure the distance parameter between the standby OLT and each ONU over the second management channel, and in the measurement process, the primary OLT still uses the first service channel to perform service data transmission with the at least one ONU, to avoid impact on service data transmission. When the service needs to be switched to the standby OLT, the measured distance parameter between the standby OLT and each ONU is used to perform service data transmission with each ONU over the second service channel, so that the service can be quickly switched to the standby OLT, to avoid long-time service interruption.

Refer to FIG. 7. This application provides a method 700 applied to a PON system. The PON system may be the PON system 100 in the dual homing protection technology shown in FIG. 1 or FIG. 2, or may be the PON system 100 in the single homing protection technology shown in FIG. 3 or FIG. 4, or may be a PON system combined with an optical line selector in FIG. 5. The PON system includes a primary OLT, a standby OLT, and at least one ONU. The primary OLT and the standby OLT communicate with the at least one ONU by using a first ODN. In the method, when the standby OLT performs service data transmission with each ONU through at least one second service channel, and when the primary OLT detects that a main link connected to the primary OLT recovers, a service is switched to the primary OLT, so that the primary OLT performs service data transmission with each ONU through at least one first service channel. The method 700 includes the following steps.

Step 701: A primary OLT detects an uplink optical signal received through any one of the first service channels and/or a first management channel, and when detected strength of the uplink optical signal exceeds a first threshold, performs the following step 702.

When the standby OLT performs service data transmission with the at least one ONU, each of the at least one ONU sends an uplink optical signal through the at least one first service channel and at least one second service channel.

The primary OLT detects the uplink optical signal received through the any one of the first service channels and/or the first management channel, and when the detected strength of the uplink optical signal exceeds the first threshold, it indicates that the uplink optical signal can be received from the any one of the first service channels and/or the first management channel, and the main link connected to the primary OLT may be restored to normal. The main link is a shared part of a link between the primary OLT and each ONU.

When the primary OLT and the standby OLT are two different devices, the primary OLT sends a notification message to the standby OLT. The standby OLT receives the notification message, and stops sending a downlink optical signal over a second management channel. When the primary OLT and the standby OLT are two modules in a first OLT device, when it is determined that the primary OLT receives the uplink optical signal from any one of the first service channel and/or the first management channel, the first OLT device controls the standby OLT to stop sending the downlink optical signal over the second management channel.

Step 702: The primary OLT determines that the standby OLT stops sending a downlink optical signal over the second management channel.

For a detailed implementation process in which the primary OLT determines that the standby OLT stops sending a downlink optical signal over the second management channel, refer to related content of the standby OLT in step 601 in the method 600 shown in FIG. 6, and details are not described herein again.

Step 703: The primary OLT sends a ranging request to the first ONU over the first management channel, where the first ONU is one of the at least one ONU.

For a detailed implementation process in which the primary OLT sends the ranging request to the first ONU, refer to related content of the standby OLT in step 602 in the method 600 shown in FIG. 6, and details are not described herein again.

Step 704: The first ONU receives the ranging request over the first management channel, and sends a ranging response to the primary OLT over the first management channel.

For a detailed implementation process in which the first ONU sends the ranging response to the primary OLT over the first management channel, refer to related content of step 603 in the method 600 shown in FIG. 6, and details are not described herein again.

Step 705: The primary OLT obtains a distance parameter between the first ONU and the primary OLT based on the ranging response received from the first ONU over the first management channel, and obtains signal quality corresponding to the first ONU.

For a detailed implementation process in which the primary OLT obtains the distance parameter between the first ONU and the primary OLT and obtains the signal quality corresponding to the first ONU, refer to related content of the standby OLT in step 604 in the method 600 shown in FIG. 6, and details are not described herein again.

In some embodiments, the primary OLT obtains the distance parameter between the primary OLT and each ONU and obtains the signal quality corresponding to each ONU by performing the procedure of steps 703 to 705.

Step 706: The primary OLT determines whether the distance parameter between the primary OLT and each of the at least one ONU is obtained, and determines a status of a main link based on signal quality corresponding to each ONU, where the main link is a shared part of links between the primary OLT and the ONUs.

The primary OLT may determine the at least one ONU that is online on the standby OLT. If the primary OLT obtains the distance parameter between the primary OLT and each of the at least one ONU, it indicates that each ONU can successfully be online on the primary OLT. Then, it is determined whether the signal quality corresponding to each ONU exceeds a quality threshold. If the signal quality corresponding to each ONU exceeds the quality threshold, it is determined that the status of the main link is a normal status; or if the signal quality corresponding to each ONU does not exceed the quality threshold, it is determined that the status of the main link is an abnormal status.

Step 707: When the distance parameter between the primary OLT and each of the at least one ONU is obtained and the status of the main link is a normal status, the primary OLT controls the standby OLT to stop performing service data transmission with the at least one ONU over the second service channel.

When the primary OLT and the standby OLT are two devices, the primary OLT sends a service switchback indication to the standby OLT. The standby OLT receives the service switchback indication, and stops sending the downlink optical signal over the at least one second service channel. That is, service data transmission with each ONU through the at least one second service channel is stopped. When the primary OLT and the standby OLT are two modules in the first OLT device, the first OLT device directly controls the standby OLT to stop sending the downlink optical signal over the at least one second service channel. Because each ONU cannot receive a downlink optical signal over the at least one second service channel, the ONU does not send an uplink optical signal over the at least one second service channel and the at least one first service channel in response to the downlink optical signal.

Step 708: The primary OLT determines that the standby OLT stops performing service data transmission with the at least one ONU over the second service channel.

For a detailed implementation process in which the primary OLT determines that the standby OLT stops performing service data transmission with the at least one ONU over the second service channel, refer to related content of the standby OLT in step 605 in the method 600 shown in FIG. 6, and details are not described herein again.

Step 709: The primary OLT performs service data transmission with each of the at least one ONU over the first service channel.

For a detailed implementation process in which the primary OLT performs service data transmission with each of the at least one ONU over the first service channel, refer to related content of the standby OLT in step 606 in the method 600 shown in FIG. 6, and details are not described herein again.

In this embodiment of this application, when the main link connected to the primary OLT is restored to normal, the standby OLT stops sending the downlink optical signal over the second management channel. In this way, the primary OLT may measure, over the second management channel, the distance parameter between the primary OLT and each ONU and the signal quality corresponding to each ONU, and determine, based on the signal quality corresponding to each ONU, whether the main link is normal. In a measurement process, the standby OLT still uses the second service channel to perform service data transmission with the at least one ONU, to avoid impact on service data transmission. When the primary OLT determines that the main link is normal and the distance parameter between the primary OLT and each ONU can be obtained, the primary OLT uses the distance parameter between the primary OLT and each ONU to perform service data transmission with each ONU over the first service channel, so that the service can be quickly switched to the primary OLT, to avoid long-time service interruption.

Figure 8:
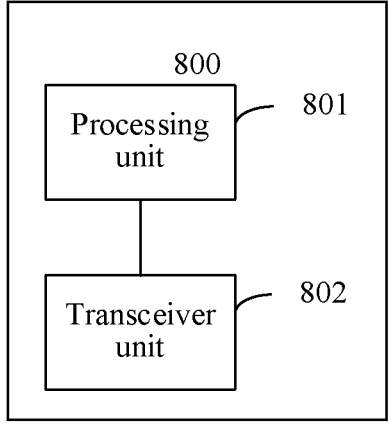
FIG. 8 is a schematic diagram of a structure of an apparatus applied to a PON system according to an embodiment of this application.

Refer to FIG. 8. An embodiment of this application provides an apparatus 800 applied to a PON system. A first PON system includes a primary optical line terminal OLT, the apparatus 800, and at least one optical network unit ONU. The primary OLT performs window open ranging on the at least one ONU over a first management channel, and the primary OLT performs service data transmission with any ONU over a first service channel. The apparatus 800 is deployed on the standby OLT of the PON system 100 shown in FIG. 1 to FIG. 5, and for example, is the standby OLT in the method 600 shown in FIG. 6. The apparatus 800 includes:

a processing unit 801, configured to determine that the primary OLT stops sending a downlink optical signal over the first management channel; and a transceiver unit 802, configured to send a ranging request to a first ONU over a second management channel, where the first ONU is one of the at least one ONU, and the second management channel is a channel between the apparatus 800 and the at least one ONU.

The processing unit 801 is further configured to obtain a distance parameter between the first ONU and the apparatus 800 based on a ranging response received by the transceiver unit 802 from the first ONU over the second management channel.

Optionally, for a detailed implementation process in which the processing unit 801 determines that the primary OLT stops sending the downlink optical signal over the first management channel, refer to related content in step 601 in the method 600 shown in FIG. 6, and details are not described herein again.

Optionally, for a detailed implementation process in which the processing unit 801 obtains the distance parameter between the first ONU and the apparatus 800, refer to related content in step 604 in the method 600 shown in FIG. 6. Details are not described herein again.

Optionally, the transceiver unit 803 is further configured to receive a ranging notification sent by the primary OLT, where the ranging notification indicates the apparatus 800 to perform ranging.

The processing unit 801 is configured to determine, based on the ranging notification, that the primary OLT stops sending a downlink signal over the first management channel.

Optionally, the transceiver unit 803 is further configured to receive a ranging notification sent by the primary OLT, where the ranging notification indicates the apparatus 800 to perform ranging.

The processing unit 801 is configured to: detect an uplink optical signal received over the second management channel, and when strength of the detected uplink optical signal is lower than a first threshold, determine that the primary OLT stops sending a downlink optical signal over the first management channel.

Optionally, for a detailed implementation process in which the processing unit 801 determines that the primary OLT stops sending the downlink optical signal over the first management channel, refer to related content in step 601 in the method 600 shown in FIG. 6, and details are not described herein again.

Optionally, the primary OLT and the apparatus 800 are modules in a first OLT device, the primary OLT includes a first port of the first OLT device, the apparatus 80o includes a second port of the first OLT device, the first management channel and the first service channel are carried on a link between the first port and the at least one ONU, and the second management channel is carried on a link between the second port and the at least one ONU.

Optionally, the processing unit 801 is further configured to measure an optical signal corresponding to the ranging response, and determine signal quality corresponding to the first ONU.

Optionally, the signal quality includes received optical power.

Optionally, the processing unit 801 is further configured to determine a status of a main link based on signal quality corresponding to each of the at least one ONU, where the main link is a shared part of a link between the apparatus 800 and the ONUs.

Optionally, for a detailed implementation process in which the processing unit 801 determines the status of the main link, refer to related content in step 604 in the method 600 shown in FIG. 6. Details are not described herein again.

Optionally, the processing unit 801 is further configured to determine that the primary OLT stops performing service data transmission with the at least one ONU over the first service channel.

The transceiver unit 802 is further configured to perform service data transmission with the at least one ONU over a second service channel based on a distance parameter between each of the at least one ONU and the apparatus 800.

Optionally, for a detailed implementation process in which the processing unit 801 determines that the primary OLT stops performing service data transmission with the at least one ONU over the first service channel, refer to related content in step 605 in the method 600 shown in FIG. 6, and details are not described herein again.

Optionally, for a detailed implementation process in which the transceiver unit 802 performs service data transmission with the at least one ONU over the second service channel, refer to related content in step 606 in the method 600 shown in FIG. 6. Details are not described herein again.

Optionally, the processing unit 801 is further configured to obtain, based on the distance parameter between each ONU and the apparatus 800, configuration information of a sending slot corresponding to each ONU.

The transceiver unit 802 is configured to send, to each ONU, the configuration information of the sending slot corresponding to the ONU, where the first ONU is configured to send service data in a sending slot corresponding to the first ONU over the second service channel; and receive the service data over the second service channel.

Optionally, for a detailed implementation process in which the transceiver unit 802 obtains the configuration information of the sending slot corresponding to each ONU, refer to related content in step 606 in the method 600 shown in FIG. 6, and details are not described herein again.

The processing unit 801 is further configured to obtain a compensation delay based on the distance parameter between the apparatus 800 and the first ONU and a distance parameter between the primary OLT and the first ONU.

The processing unit 801 is further configured to adjust, based on the compensation delay, a first receive window to obtain a second receive window, where the first receive window is obtained based on a distance threshold corresponding to the primary OLT, and the distance threshold is greater than or equal to a maximum value of distances between the primary OLT and the ONUs.

The transceiver unit 802 is configured to receive, in the second receive window over the second service channel, service data sent by each ONU.

Optionally, for a detailed implementation process in which the transceiver unit 802 obtains the compensation delay and adjusts the first receive window, refer to related content in step 606 in the method 600 shown in FIG. 6. Details are not described herein again.

Optionally, the transceiver unit 802 is further configured to send an OLT switching indication to each of the at least one ONU over the second service channel, where the OLT switching indication indicates each ONU to perform service data transmission with the apparatus 800 over the second service channel.

Optionally, the processing unit 801 is further configured to:

detect an uplink optical signal received over the second service channel; and when detecting that strength of the uplink optical signal is lower than a first threshold, determine that the primary OLT stops sending a downlink optical signal over the first service channel.

Optionally, the distance parameter for communication between the apparatus 800 and the first ONU includes an equalization delay for communication between the apparatus 800 and the first ONU, and the transceiver unit 802 is further configured to send the equalization delay to the first ONU.

Optionally, the processing unit 801 is further configured to turn on a communication connection between the apparatus 800 and a first optical distribution network ODN, where a communication connection exists between the primary OLT and the first ODN, and the first ODN communicates with the at least one ONU.

Optionally, a communication connection exists between the apparatus 800 and a first interface of an optical line selector, the optical line selector further includes a second interface and at least one third interface, a communication connection exists between the second interface and the first ODN, the at least one third interface is in a one-to-one correspondence with at least one second PON system, for any one of the at least one third interface, a communication connection exists between the third interface and a second ODN included in a second PON system corresponding to the third interface, and the second ODN further communicates with a primary OLT and at least one ONU included in the second PON system.

The processing unit 801 is configured to control the optical line selector to connect the first interface and the second interface.

In this embodiment of this application, in a process in which the primary OLT performs service data transmission with each ONU over the first service channel, the processing unit determines that the primary OLT stops sending the downlink optical signal over the first management channel, and measures the distance parameter between the primary OLT and each ONU over the second management channel. In this way, transmission of the service data between the primary OLT and each ONU is not affected during ranging, and when a service is switched to the apparatus, the transceiver unit directly uses the measured distance parameter between the standby OLT and each ONU to perform service data transmission with each ONU over the second service channel, so that the service can be quickly switched to the apparatus, to avoid long-time service interruption.

Figure 9:
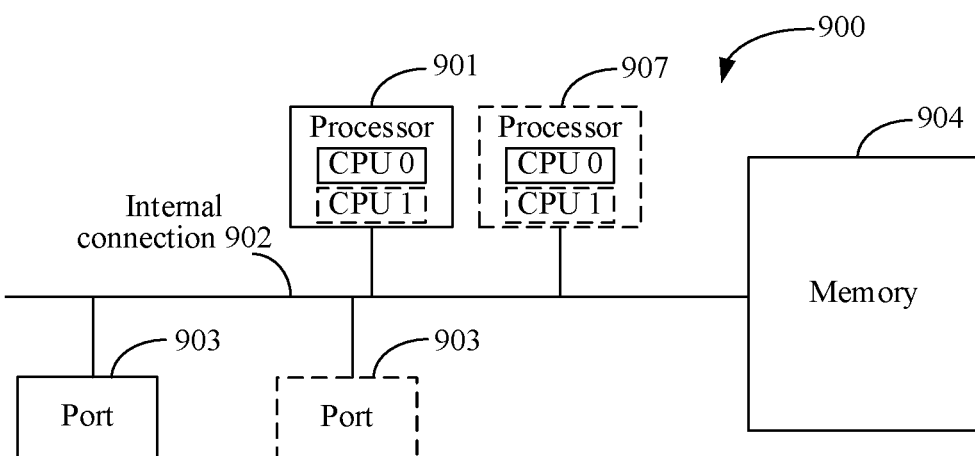
FIG. 9 is a schematic diagram of a structure of another apparatus applied to a PON system according to an embodiment of this application.

Refer to FIG. 9. An embodiment of this application provides a schematic diagram of a link status measurement apparatus 900. The apparatus 900 may be the standby OLT in the PON system 100 shown in FIG. 1 to FIG. 5, or the standby OLT in the method 600 shown in FIG. 6. The apparatus 900 includes at least one processor 901, an internal connection 902, and at least one port 903.

The apparatus 900 is an apparatus of a hardware structure, and can be configured to implement the function modules in the apparatus 800 shown in FIG. 8. For example, a person skilled in the art may figure out that the processing unit 801 in the apparatus 800 shown in FIG. 8 may be implemented by the at least one processor 901, and the transceiver unit 802 in the apparatus 800 shown in FIG. 8 may be implemented by the at least one port 903.

Optionally, the apparatus 900 may be further configured to implement a function of the standby OLT in any one of the foregoing embodiments.

Optionally, the at least one port 903 includes a second port on the standby OLT.

Optionally, the processor 901 may be a hardware circuit, a general-purpose central processing unit (CPU), a network processor (NP), a microprocessor, an application-specific integrated circuit (ASIC), or one or more integrated circuits configured to control program execution in the solutions of this application.

Optionally, refer to FIG. 9. When the processor 901 is a CPU, a microprocessor, or the like, the apparatus 900 further includes a memory 904. The processing unit 801 in the apparatus Boo shown in FIG. 8 may be implemented by invoking code in the memory 904 by the at least one processor 901.

The internal connection 902 may include a path in which information is transmitted between the foregoing components. Optionally, the internal connection 902 is a board, a bus, or the like.

The at least one port 903 is configured to communicate with another device or a communication network.

The memory 904 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or another optical disc storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer, but is not limited thereto. The memory may exist independently, and is connected to the processor through the bus. The memory may alternatively be integrated with the processor.

The memory 904 is configured to store application program code for executing the solutions in this application, and the processor 901 controls execution of the application program code. The processor 901 is configured to execute the application program code stored in the memory 904, and cooperate with the at least one port 903, so that the apparatus 900 implements a function in the method in this present patent.

During specific implementation, in an embodiment, the processor 901 may include one or more CPUs such as a CPU 0 and a CPU 1 in FIG. 9.

In a specific implementation, in an embodiment, the apparatus 90o may include a plurality of processors, for example, the processor 901 and a processor 907 shown in FIG. 9. Each of the processors may be a single-core (single-CPU) processor, or may be a multi-core (multi-CPU) processor. The processor herein may be one or more devices, circuits, and/or processing cores configured to process data (for example, computer program instructions).

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are only optional embodiments of this application, but are not intended to limit this application. Any modification, equivalent replacement, or improvement made within the principle of this application should fall within the protection scope of this application.

What is claimed is:

1. A method applied to a passive optical network (PON) system comprising a primary optical line terminal (OLT), a standby OLT, and at least one optical network unit (ONU), wherein the primary OLT is configured to perform window open ranging on the at least one ONU over a first management channel, and is configured to perform service data transmission with any ONU over a first service channel, the method comprising:

determining, by the standby OLT, that the primary OLT has stopped sending a downlink optical signal over the first management channel;

sending, by the standby OLT, a ranging request to a first ONU over a second management channel, wherein the first ONU is one of the at least one ONU, and the second management channel is a channel between the standby OLT and the at least one ONU; and obtaining, by the standby OLT, a distance parameter between the first ONU and the standby OLT based on a ranging response received from the first ONU over the second management channel, wherein determining, by the standby OLT, that the primary OLT has stopped sending the downlink optical signal over the first management channel comprises:

receiving, by the standby OLT, a ranging notification sent by the primary OLT, wherein the ranging notification indicates that the standby OLT is to perform ranging, detecting, by the standby OLT, an uplink optical signal received over the second management channel, and in response to a strength of the detected uplink optical signal being lower than a first threshold, determining that the primary OLT has stopped sending the downlink optical signal over the first management channel.

2. The method according to claim 1, wherein determining, by the standby OLT, that the primary OLT has stopped sending the downlink optical signal over the first management channel comprises:

receiving, by the standby OLT, a ranging notification sent by the primary OLT, wherein the ranging notification indicates that the standby OLT is to perform ranging; and determining, by the standby OLT based on the ranging notification, that the primary OLT has stopped sending the downlink optical signal over the first management channel.

3. The method according to claim 1, wherein:

the primary OLT and the standby OLT are modules in a first OLT device;

the primary OLT comprises a first port of the first OLT device;

the standby OLT comprises a second port of the first OLT device;

the first management channel and the first service channel are carried on a link between the first port and the at least one ONU;

and the second management channel is carried on a link between the second port and the at least one ONU.

4. The method according to claim 1, wherein the method further comprises:

measuring, by the standby OLT, an optical signal corresponding to the ranging response; and determining a signal quality corresponding to the first ONU.

5. The method according to claim 4, wherein the signal quality comprises received optical power.

6. The method according to claim 4, wherein the method further comprises:

determining, by the standby OLT, a status of a main link based on signal quality corresponding to each of the at least one ONU, wherein the main link is a shared part of links between the standby OLT and the at least one ONU.

7. The method according to claim 1, wherein the method further comprises, after the standby OLT obtains the distance parameter for communication between the first ONU and the standby OLT:

determining, by the standby OLT, that the primary OLT has stopped performing service data transmission with the at least one ONU over the first service channel; and performing, by the standby OLT, service data transmission with the at least one ONU over a second service channel based on a distance parameter between each of the at least one ONU and the standby OLT.

8. The method according to claim 7, wherein performing, by the standby OLT, service data transmission with the at least one ONU over the second service channel based on the distance parameter between each of the at least one ONU and the standby OLT comprises:

obtaining, by the standby OLT based on the distance parameter between each ONU and the standby OLT, configuration information of a sending slot corresponding to each ONU;

sending, by the standby OLT to each ONU, the configuration information of the sending slot corresponding to the ONU, wherein the first ONU is configured to send service data in a sending slot corresponding to the first ONU over the second service channel; and receiving, by the standby OLT, the service data over the second service channel.

9. The method according to claim 7, wherein performing, by the standby OLT, service data transmission with the at least one ONU over the second service channel based on the distance parameter between each of the at least one ONU and the standby OLT comprises:

obtaining, by the standby OLT, a compensation delay based on the distance parameter between the standby OLT and the first ONU and a distance parameter between the primary OLT and the first ONU;

adjusting, by the standby OLT based on the compensation delay, a first receive window to obtain a second receive window, wherein the first receive window is obtained based on a distance threshold corresponding to the primary OLT, and the distance threshold is greater than or equal to a maximum value of distances between the primary OLT and the at least one ONU; and receiving, by the standby OLT in the second receive window over the second service channel, service data sent by each ONU.

10. An apparatus applied to a passive optical network (PON) system, wherein a first PON system comprises a primary optical line terminal (OLT), the apparatus, and at least one optical network unit (ONU), the primary OLT is configured to perform window open ranging on the at least one ONU over a first management channel, and the primary OLT is configured to perform service data transmission with any ONU over a first service channel, the apparatus comprising:

a processor configured to determine that the primary OLT has stopped sending a downlink optical signal over the first management channel; and a transceiver configured to send a ranging request to a first ONU over a second management channel, wherein the first ONU is one of the at least one ONU, and the second management channel is a channel between the apparatus and the at least one ONU, wherein the processor is further configured to:

obtain a distance parameter between the first ONU and the apparatus based on a ranging response that is received by the transceiver over the second management channel and that is from the first ONU, measure an optical signal corresponding to the ranging response, and determine a signal quality corresponding to the first ONU.

11. The apparatus according to claim 10, wherein the transceiver is further configured to receive a ranging notification sent by the primary OLT, wherein the ranging notification indicates that the apparatus is to perform ranging; and the processor is configured to determine, based on the ranging notification, that the primary OLT has stopped sending a downlink signal over the first management channel.

12. The apparatus according to claim 10, wherein the transceiver is further configured to receive a ranging notification sent by the primary OLT, wherein the ranging notification indicates that the apparatus is to perform ranging; and the processor is further configured to:

detect an uplink optical signal received over the second management channel, and in response to a strength of the detected uplink optical signal being lower than a first threshold, determine that the primary OLT has stopped sending the downlink optical signal over the first management channel.

13. The apparatus according to claim 10, wherein:

the primary OLT and the apparatus are modules in a first OLT device;

the primary OLT comprises a first port of the first OLT device;

the apparatus comprises a second port of the first OLT device;

the first management channel and the first service channel are carried on a link between the first port and the at least one ONU; and the second management channel is carried on a link between the second port and the at least one ONU.

14. The apparatus according to claim 10, wherein the signal quality comprises received optical power.

15. The apparatus according to claim 10, wherein the processor is further configured to: determine a status of a main link based on signal quality corresponding to each of the at least one ONU, wherein the main link is a shared part of links between the apparatus and the at least one ONU.

16. The apparatus according to claim 10, wherein:

the processor is further configured to determine that the primary OLT has stopped performing service data transmission with the at least one ONU over the first service channel; and the transceiver is further configured to perform service data transmission with the at least one ONU over a second service channel based on a distance parameter between each of the at least one ONU and the apparatus.

17. The apparatus according to claim 16, wherein:

the processor is further configured to obtain, based on the distance parameter between each ONU and the apparatus, configuration information of a sending slot corresponding to each ONU;

the transceiver is configured to send, to each ONU, the configuration information of the sending slot corresponding to the ONU; and the first ONU is configured to send service data in a sending slot corresponding to the first ONU over the second service channel, and to receive the service data over the second service channel.

18. The apparatus according to claim 10, further comprising:

the primary OLT; and the at least one ONU.

19. A passive optical network (PON) system comprising: a primary optical line terminal (OLT), a standby OLT, and at least one optical network unit (ONU), the primary OLT performs window open ranging on the at least one ONU over a first management channel, and the primary OLT performs service data transmission with any ONU over a first service channel, wherein:

the primary OLT is configured to:

perform window open ranging on the at least one ONU over the first management channel, perform service data transmission with any ONU over the first service channel in response to stopping sending a downlink management signal over the first management channel, send a ranging notification to the standby OLT, wherein the ranging notification indicates that the standby OLT is to perform ranging; and the standby OLT is configured to:

determine that the primary OLT has stopped sending a downlink optical signal over the first management channel, send a ranging request to a first ONU over a second management channel, wherein the first ONU is one of the at least one ONU, and the second management channel is a channel between the standby OLT and the at least one ONU, and obtain a distance parameter between the first ONU and the standby OLT based on a ranging response received from the first ONU over the second management channel.

20. The PON system according to claim 19, wherein the standby OLT is further configured to:

receive the ranging notification sent by the primary OLT, wherein the ranging notification indicates that the standby OLT is to perform ranging;

detect an uplink optical signal received over the second management channel; and in response to a strength of the detected uplink optical signal being lower than a first threshold, determine that the primary OLT has stopped sending the downlink optical signal over the first management channel.

21. The PON system according to claim 19, wherein the standby OLT is further configured to:

measure an optical signal corresponding to the ranging response; and determine a signal quality corresponding to the first ONU.

*   *   *   *   *